United States Patent
Ramasamy et al.

(10) Patent No.: US 10,396,431 B2
(45) Date of Patent: Aug. 27, 2019

(54) SYSTEM AND METHOD FOR INTEGRATING AND ADAPTING HYBRID ANTENNA APERTURE WITHIN FULLY METALLIC CHASSIS BASED ON CHASSIS OPERATING CONFIGURATION

(71) Applicant: Dell Products, LP, Round Rock, TX (US)

(72) Inventors: Suresh K. Ramasamy, Austin, TX (US); Brandon J. Brocklesby, Pflugerville, TX (US); Timothy C. Shaw, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/884,848

(22) Filed: Jan. 31, 2018

(65) Prior Publication Data

US 2019/0237848 A1    Aug. 1, 2019

(51) Int. Cl.
| | |
|---|---|
| H01Q 1/22 | (2006.01) |
| G06F 1/16 | (2006.01) |
| H04B 1/034 | (2006.01) |
| H01Q 1/24 | (2006.01) |
| H04B 1/3827 | (2015.01) |

(52) U.S. Cl.
CPC ........ *H01Q 1/2266* (2013.01); *G06F 1/1601* (2013.01); *G06F 1/1637* (2013.01); *G06F 1/1662* (2013.01); *G06F 1/1681* (2013.01); *G06F 1/1683* (2013.01); *H01Q 1/24* (2013.01); *H04B 1/034* (2013.01); *H04B 1/3838* (2013.01)

(58) Field of Classification Search
None
See application file for complete search history.

(56) References Cited

U.S. PATENT DOCUMENTS

| | | |
|---|---|---|
| 8,963,782 B2 | 2/2015 | Ayala Vazquez |
| 2005/0146475 A1 | 7/2005 | Bettner |
| 2016/0261022 A1* | 9/2016 | Guterman ............ H01Q 1/2266 |
| 2017/0062937 A1 | 3/2017 | Ganchrow |
| 2017/0117608 A1 | 4/2017 | Bologna |
| 2017/0117611 A1 | 4/2017 | Lepe |
| 2017/0365930 A1 | 12/2017 | Nishioka |

* cited by examiner

*Primary Examiner* — Mohammed Rachedine
(74) *Attorney, Agent, or Firm* — Prol Intellectual Property Law, PLLC; H. Kenneth Prol

(57) ABSTRACT

An information handling system operable to transition between a plurality of positional configurations comprising a metallic case containing components of the information handling system including a base housing metal chassis operably connected to a display housing metal chassis via a hinge where the base housing metal chassis and display housing metal chassis are moveable with respect to one another around the hinge according to a plurality of positional configurations and the base housing metal chassis forms a back edge of a base housing and a base antenna aperture platform extends from the back edge with a base antenna aperture disposed within the base antenna aperture platform. A radio frequency front end to transmit a communications signal via the base antenna aperture when the base housing metal chassis and display housing metal chassis are placed in the plurality of positional configurations.

20 Claims, 15 Drawing Sheets

SYSTEM AND METHOD FOR
INTEGRATING AND ADAPTING HYBRID
ANTENNA APERTURE WITHIN FULLY
METALLIC CHASSIS BASED ON CHASSIS
OPERATING CONFIGURATION

FIELD OF THE DISCLOSURE

The present disclosure generally relates to information handling systems, and more particularly relates to an apparatus including a hybrid antenna aperture incorporated within a metal chassis and operable according to a plurality of configurations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may also include telecommunication, network communication, and video communication capabilities. The information handling system may also include one or more buses operable to transmit communications between the various hardware components. The information handling system may also include telecommunication, network communication, and video communication capabilities. Information handling system chassis parts may include case portions such as for a laptop information handling system including the C cover over components designed with a metal structure. The information handling system may be configurable such that the information handling system may operate in any of several usage mode configurations.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
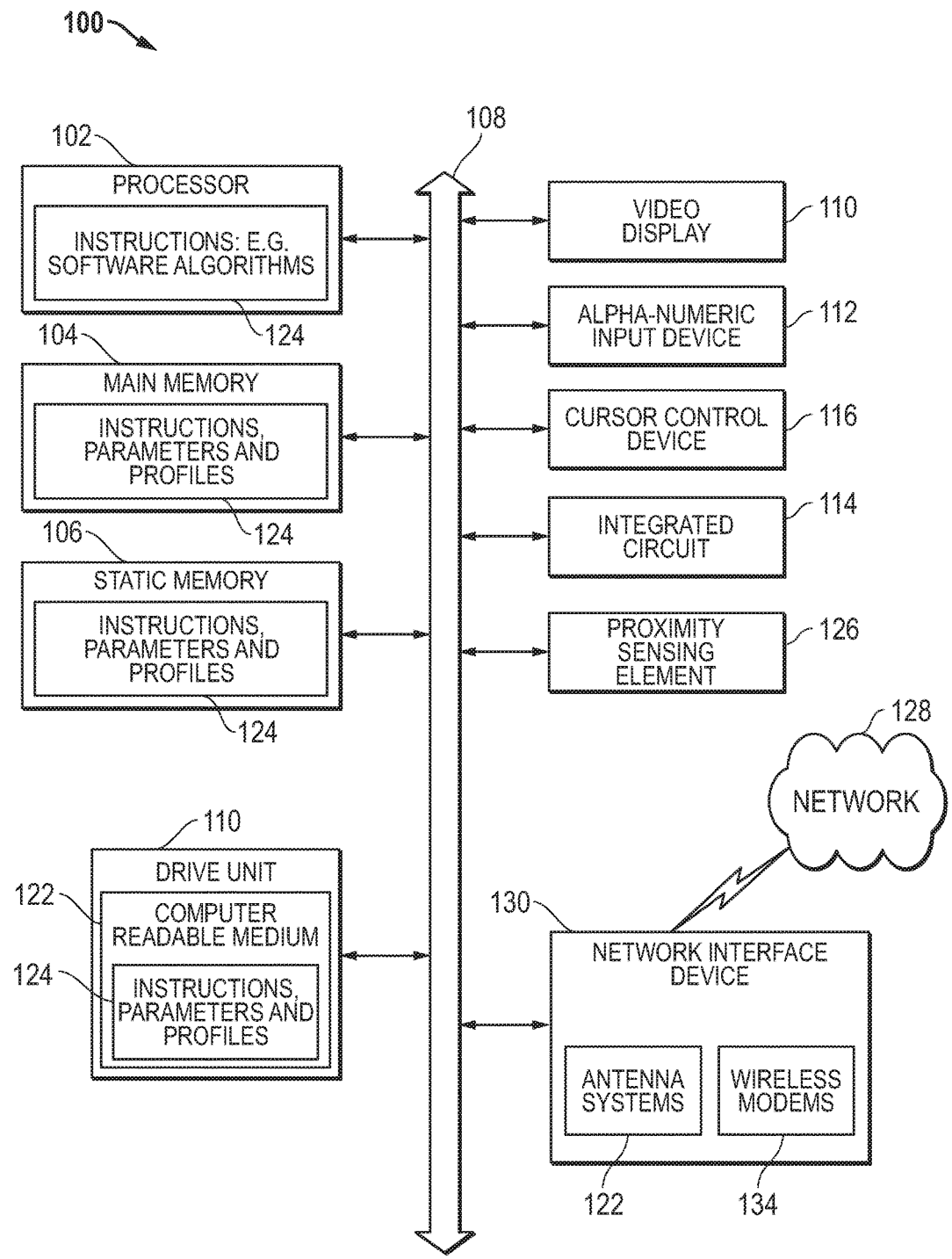
FIG. 1 illustrates a generalized embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts are more commonly designed with a metal structure. In an example embodiment, a convertible laptop information handling system may include a plurality of covers for the interior components of the information handling system. For example, a small form factor case may include an "A cover" which serves as a back cover for a display housing and a "B cover" which may serve as the bezel, if any, and a display screen of the convertible laptop information handling system in an embodiment. In a further example, a small form factor case may include a "C cover" housing a keyboard, touchpad, and any cover in which these components are set and a "D cover" base housing for the convertible information handling system. With the need for utility of lighter, thinner, and more streamlined devices, the use of full metal portions for the outer covers of the display and base housing (e.g. the A cover and the D cover) is desirable for strength as well as aesthetic reasons. At the same time, the demands for wireless operation also increase. This includes addition of many simultaneously operating radiofrequency systems, addition of more antennas, and utilization of various antenna types. However, the thinner and more streamlined devices have fewer locations and area available for mounting radiofrequency transmitters on these mobile information handling systems. Thus, a streamlined, full metal chassis capable of meeting the increasing wireless operation demands is needed.

Previous information handling systems would address these competing needs by providing for cutout portions of a metal outer chassis cover filled with plastic behind which radio transmitters would be mounted. The cutouts to accommodate RF transmitters were often aesthetically undesirable and required additional plastic components to cover the cutout, thus failing to fully meet the streamlining needs. The plastic components added a component to be manufactured and were required to be seamlessly integrated into an otherwise smooth metal chassis cover. Further, the plastic portions included may be more expensive to machine than aluminum alloy metals, and may require intricate multi-step processes for integrating the metal and plastic parts into a single chassis. This requirement could require difficult and expensive processes to manufacture with a less desirable result. Other options included, for aperture type antenna transmitters, creation of an aperture in the metal display panel chassis and using the metal chassis as a ground plane for excitation of the aperture. Similarly, the visible apertures in the chassis cover were also less desirable, and the radiofrequency transmission hotspot would be located on the metal chassis cover itself.

In addition, in the case of the convertible laptop information handling system, 360-degree configurability is necessary. Thus, often an antenna such as an aperture antenna system would need to be located at the top (e.g. "A cover") with a plastic antenna window in a metal chassis cover to radiate in 360-degree mode (such as closed mode), or at the bottom (e.g. "D cover") to radiate in 360-degree mode (such as tablet mode). Such a configuration would make the display panel housing (e.g. "A cover") or the base panel housing (e.g. "D cover") thicker, to accommodate antennas and cables behind the plastic panel at the top (or bottom) of either housing. Overall, a thicker convertible laptop information handling system would result, thus failing to meet the streamlining needs. A solution is needed that does not increase the thickness of the metal chassis, and does not require additional components and manufacturing steps such as those associated with installation of RF transparent windows.

Embodiments of the present disclosure may decrease the complexity and cost of creating chasses for information handling systems by forming the outer chassis (e.g. the A cover and the D cover) entirely of metal and removing any additional RF transparent plastic windows from the outer chassis design. The metal chassis in embodiments described herein may include a hinge operably connecting the "A cover" to the "D cover" such that the keyboard and touchpad enclosed within the "C cover" and attached to the "D cover" may be placed in a plurality of configurations with respect to the digital display enclosed within the "B cover" and attached to the "A cover." The plurality of configurations may include, but may not be limited to, an open configuration in which the "A cover" is oriented at a right or obtuse angle from the "D cover" (similar to an open laptop computer), a closed configuration in which the "A cover" lies substantially parallel to the "D cover" (similar to a closed laptop computer), and a tablet configuration in which the "A cover" is rotated nearly 360 degrees from its closed orientation (placing the "D cover" directly beneath the "A cover," such that the user can interact with the digital display enclosed within the "B cover").

Manufacture of embodiments of the present disclosure may involve fewer extraneous parts than previous chasses by forming the exterior or outer portions of the information handling system, including the bottom portion of the "D cover" and the top portion of the "A cover," entirely from metal. In order to allow for manufacture of fully metallic outer chasses including the "A cover" and the "D cover," embodiments of the present disclosure form the full form factor case enclosing the information handling system such that one or more transmitting antennas integrated into the base of the information handling system emit signals from the "C cover" side of the base, rather than from an exterior or outer surface of the "D cover." The "D cover" in embodiments of the present disclosure may have a bottom portion lying substantially parallel to the "C cover," and a back edge substantially perpendicular to the "C cover," so as to allow the "D cover" to join the "C cover" in an interior portion of the information handling system. The "D cover" may include one or more antenna aperture platforms disposed between the back edge of the information handling system and the keyboard portion of the "C cover." Such antenna aperture platforms may extend from the back edge of the "D cover" toward the "C cover," on the interior portion of the base chassis.

The transmitting antennas of embodiments of the present disclosure may include aperture antennas. Aperture antennas in embodiments of the present disclosure may be a highly effective improvement on wireless antennas employed in previous information handling systems. In embodiments of the present disclosure, an antenna aperture or slot may be machined throughout the thickness of each antenna aperture platform. An aperture antenna in embodiments of the present disclosure may then be operably connected to each of the antenna aperture platforms such that the edges of the antenna aperture platforms act as RF excitable structures for the aperture antennas and the surrounding portion of the "D cover" metal chassis act as the ground plane for such antenna aperture. Such a method of placing an aperture antenna beneath a machined aperture positioned within the interior of the form factor case may exclude the integration of any RF transparent plastic windows within the exterior of "D cover" itself, thus decreasing the complexity and cost of manufacture. The transceiving antenna may then effectively transmit communications signal perpendicularly from the surface of the "D cover" antenna aperture platform. When the "D cover" and "A cover" are placed in either the open configuration, or the tablet configuration, the transceiving antenna in such an embodiment may transmit the communications signals away from the information handling system and into the nearby environment.

When the "D cover" and "A cover" are placed in the closed configuration, however, the transmitting antenna may transmit the communications signal directly toward the "A cover" lying substantially parallel to the "D cover." The "A cover" may be movably connected to the "D cover" via a hinge attached to the back edge of the information handling system. One potential solution to this issue would include placing the transmitting antenna within the "A cover," rather than the "D cover," or adding a second transmitting antenna to the "A cover," in addition to the antenna within the "D cover." Both of these solutions involve increasing the weight and thickness of the "A cover," making the information handling system bulkier and less streamlined, which current consumers find unappealing. A process that allows the communications signal to propagate beyond the fully metal "A cover" without placement of an antenna within the "A cover" is needed. Such a process may include attaching the "A cover" to the hinge such that there is a gap or secondary aperture between the "A cover" and the hinge. Further, the hinge may be located such that the gap or secondary aperture between the "A cover" and the hinge abuts the "D cover" antenna aperture when the form factor case is placed in the closed configuration. In such a way, antenna radiation emitted through the "D cover" antenna aperture may further propagate through the gap or aperture between the "A cover" and the hinge, and beyond the exterior surface of the fully metal "A cover."

Embodiments of the present disclosure may also allow transceiving antennas to operate at higher power levels in the presence of human body parts than previous information handling systems with antennas located in the base housing chassis or "D cover." The Federal Communications Commission (FCC) regulates the strength of radio frequency signals of an LTE antenna or other antenna systems within a commercial product sold in the United States may emit. Higher strength radio frequency signals may result in stronger signals and better communication, but may also increase the specific absorption rate (SAR), or rate at which energy is absorbed by the human body. The FCC requires LTE antennas within US commercial products to lower the power supplied to the LTE antenna when the antenna is in close proximity to a human body part in order to avoid any increase in SAR. In order to comply with these requirements, many LTE-compatible devices include proximity sensors that may detect nearby human body parts. The requirement of power reduction depends on hotspot radiofrequency SAR levels detected around the information handling system where a user may come into contact. Power reduction however may also have an adverse effect on radiofrequency system performance. SAR levels drop off significantly however with distance from an active transmitter. Thus, an antenna transmitter location and design where the active transmission element may be located further away from any surfaces potentially contacted by a user's body parts may not require as much power reduction.

In embodiments described herein, the "D cover" antenna aperture platform may lie vertically lower than the keyboard of the "C cover," which is the surface most likely to interface with human body parts. In such embodiments, placement of the transmitting antenna beneath the "D cover" antenna aperture platform may place the antenna further away from human body parts than an information handling system placing the transmitting antenna directly beneath, beside, or co-planar with the keyboard. In other aspects, the "D cover" may further include (in addition to the base antenna aperture), an antenna cavity placed between the "D cover" antenna aperture platform and the keyboard/keypad portion of the "C cover," creating a resonant cavity that re-radiates. The resonant cavity in embodiments may spread the surface currents more evenly across the "D cover" antenna aperture than an embodiment in which the resonant cavity is not included. Such even distribution of the current across the entire surface of the antenna aperture may decrease the likelihood of hotspots. Further, such even distribution may decrease the radiation emitted at any one point across the aperture. As a result, the SAR of the evenly distributed signal transmitted via both the antenna aperture and antenna cavity may be lower at each location along the "D cover" antenna aperture platform than the SAR of a signal transmitted with the same power via only the antenna aperture. Thus, smaller reductions in power supplied to the transmitter may be required in order to comply with FCC regulations in such embodiments. Further, by placing this gap between the "C cover" upon which a human body part may rest, and the "D cover," within which the transceiving antenna may be incorporated, embodiments of the present disclosure may locate the antenna transceiver further away from the "C cover" in contact with a user's body parts, and may not require as much power reduction.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 illustrates an information handling system 100 similar to information handling systems according to several aspects of the present disclosure. For example, an information handling system 100 may be any mobile or other information handling system capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and a cursor control device 114, such as a mouse, touchpad, or gesture or touch screen input.

Network interface device 130 represents a NIC disposed within information handling system 100, on a main circuit board of the information handling system, integrated onto another component such as processor 102, in another suitable location, or a combination thereof. The network interface device 130 can include another information handling system, a data storage system, another network, a grid management system, another suitable resource, or a combination thereof. Network interface device 130 in an embodiment may operably connect to a network 128. Connection to network 128 may be wired or wireless.

The network interface device 130 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Network interface device 130 may include one or more wireless modems 134 with transmitter/receiver circuitry, wireless controller circuitry, amplifiers and other circuitry for wireless communications. The network interface device 130 may also include antenna system 120 which may be tunable antenna systems for use with the system and methods disclosed herein. The wireless modems 134 may include wireless controllers to manage authentication, connectivity, communications, power levels for transmission, buffering, error correction, baseband processing, and other functions of the network interface device 130.

A transmitting antenna depicted as antenna systems 120 in an embodiment may comprise an antenna capable of transmitting radio frequency communications. It is contemplated the transmitting antenna 120 may be capable of transmitting radio frequency communications in any specified band, including, but not limited to frequencies associated with the LTE standard, the Wi-GIG standard, and any other forthcoming standards, as defined by the FCC. In other embodiments, the transmitting antenna 120 may be capable of transmitting radio frequency communications within only a limited subset of the LTE (or other standard) band space, such as for example, low band LTE, or high band LTE. In still other embodiments, the transmitting antenna 120 may be capable of both transmitting and receiving radio frequency communications, thus operating as a transceiving antenna. More than one transmitting antenna 120 may be present in the embodiments of the present disclosure.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 130 or any combination thereof. Application programs 124, and BIOS/FW code instructions 124 can each be implemented as single programs, or as separate programs carrying out the various features as described herein. Application program interfaces (APIs) such as Win 32 API may enable application programs 124 to interact or integrate operations with one another.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk in an example embodiment. The computer-readable medium of the main memory 104, static memory 106, and drive unit 116 may store one or more sets of code instructions 124, such as software code corresponding to the present disclosure. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The proximity-sensing element 126, in an embodiment, may sense nearby human body parts by detecting a change in an electro-magnetic field generated by the sensor. The proximity sensing element 126 in an embodiment may receive a small voltage from the integrated circuit 118 in order to emit the low-level electromagnetic field. When a human body part comes into close proximity with the proximity sensing element 126, the presence of the body part may change the local electric field of the proximity sensing element 126, which may also alter the mutual capacitance across the proximity sensor 126. The proximity sensing element 126 in an embodiment may be co-located with the transmitting antenna 120. Thus, the proximity sensing element 126 may sense the presence of a human body part nearby the transmitting antenna 120. More than one proximity sensing element may be present in the embodiments of the present disclosure.

The integrated circuit 118 in an embodiment may be operatively connected to the transmitting antenna 120, the processor 102, and to the proximity sensing element 126. The integrated circuit 118 in an embodiment may supply low-level voltage to the proximity sensing element 126, in order for the proximity sensing element 126 to emit a capacitance field, and may detect changes in the capacitance field of the proximity sensing element 126. The integrated circuit 118 in an embodiment may also supply power to the transmitting antenna 120, and may execute instructions from the processor 102 to decrease the power level supplied to the transmitting antenna 120 upon detection by the proximity sensing element 126 of a nearby human body part.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
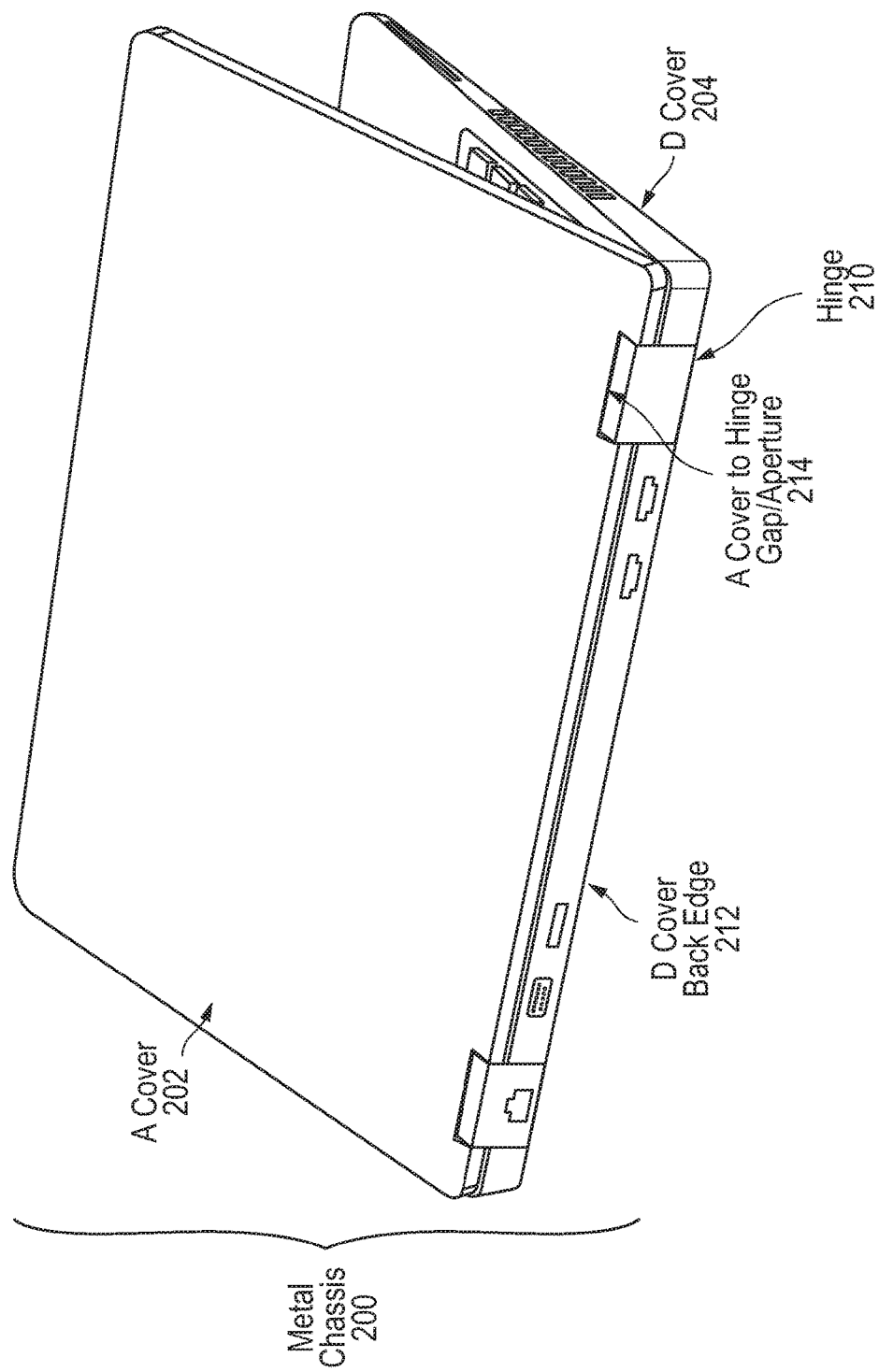
FIG. 2A is a graphical illustration of a metal chassis placed in the closed configuration according to an embodiment of the present disclosure.

FIG. 2A is a graphical illustration of a metal chassis including a base chassis and lid chassis placed in the closed configuration according to an embodiment of the present disclosure. The metal chassis 200 in an embodiment may comprise an outer metal case or shell of an information handling system such as a tablet device, laptop, or other mobile information handling system. As shown in FIG. 2A, the metal chassis 200 in an embodiment may further include a plurality of chasses or cases. For example, the metal chassis 200 may further include the A cover 202 functioning to enclose a portion of the information handling system. As another example, the metal chassis 200 in an embodiment may further include the D cover 204 functioning to enclose another portion of the information handling system which may include a transmitting antenna. As shown in FIG. 2A, when placed in the closed configuration, the A cover 202 forms a top outer protective shell, or a portion of a lid for the information handling system, while the D cover 204 forms a bottom outer protective shell, or a portion of a base. As also can be seen in FIG. 2A, in the closed configuration, the A cover 202 and the D cover 204 are substantially parallel to one another.

In some embodiments, both the A cover and the D cover may be comprised entirely of metal. In an embodiment, the A cover 202 may be movably connected to a back edge 212 of the D cover 214 via one or more hinges 210. The A cover 202 may be operably connected to the one or more hinges 210 such that a gap or aperture 214 is disposed between the A cover 202 and the one or more hinges 210, in an embodiment.

Figure 2B:
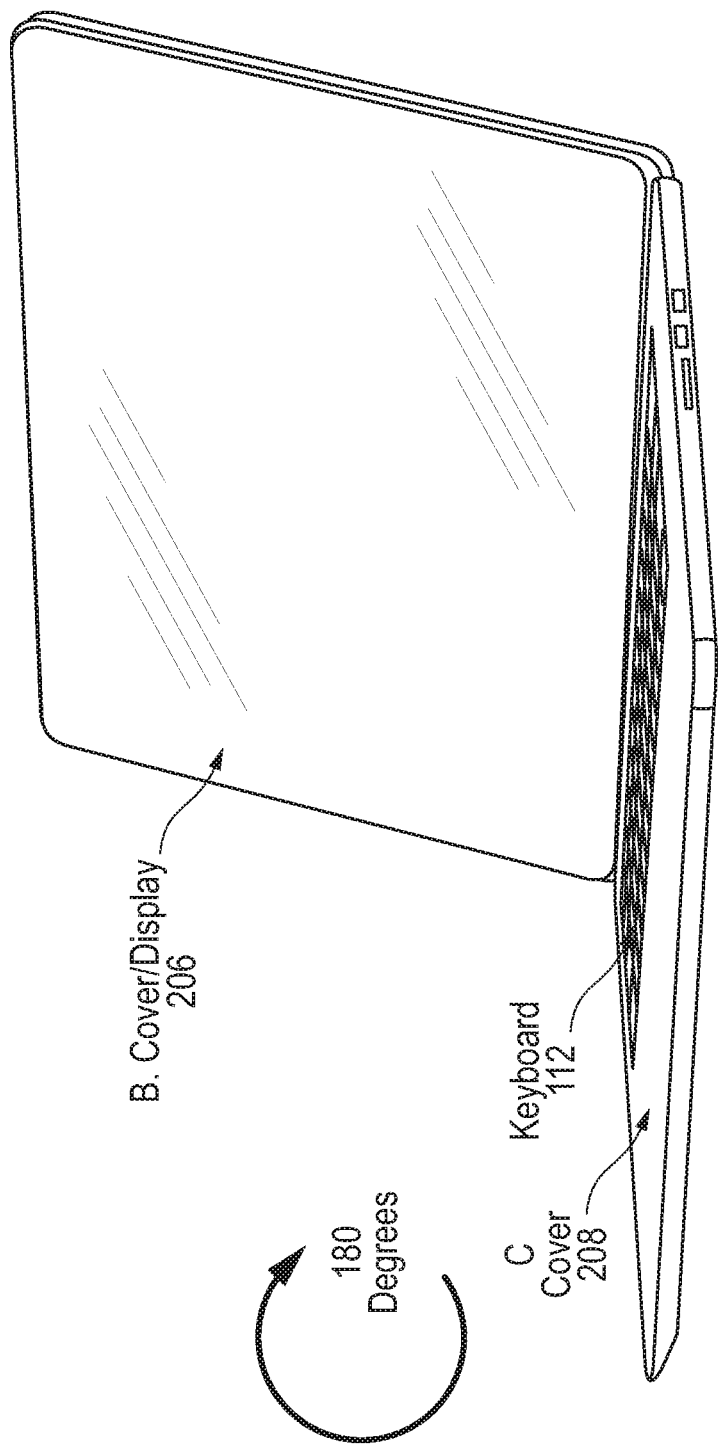
FIG. 2B is a graphical illustration of a metal chassis placed in the open configuration according to an embodiment of the present disclosure.

FIG. 2B is a graphical illustration of a metal chassis including a base chassis and lid chassis placed in the open configuration according to an embodiment of the present disclosure. The metal chassis 200 in an embodiment may further comprise an outer metal case or shell of an information handling system for housing internal components of the information handling system, such as a video display, a cursor control device, and an alpha numeric input device. As shown in FIG. 2B, the metal chassis 200 may further include the B cover 206 functioning to enclose the video or digital display device. As another example, the metal chassis 200 may further include the C cover 208 functioning to enclose the cursor control device and/or the keyboard 112 acting as an alpha numeric input device. The A cover and the B cover 206 may be joined together in an embodiment to form a fully enclosed lid chassis, while the C cover 208 and the D cover may be joined together to form a fully enclosed base chassis. Taking the closed configuration as a reference position of the lid chassis including the A cover and the B cover 206 and the base chassis including the C cover and the D cover 204, the lid chassis including the A cover and the B cover 206 may be rotated away from the base chassis including the C cover 208 and the D cover. For example, as shown in FIG. 2B, when placed in the open configuration, the lid chassis including the A cover and the B cover 206 may be rotated away from the C cover 208 and placed at an angle less than 180 degrees from the base chassis including the C cover 208 and the D cover, such that a user may view the digital display within the B cover 206 and interact with the cursor control device and/or keyboard 112 within the C cover 208.

Figure 2C:
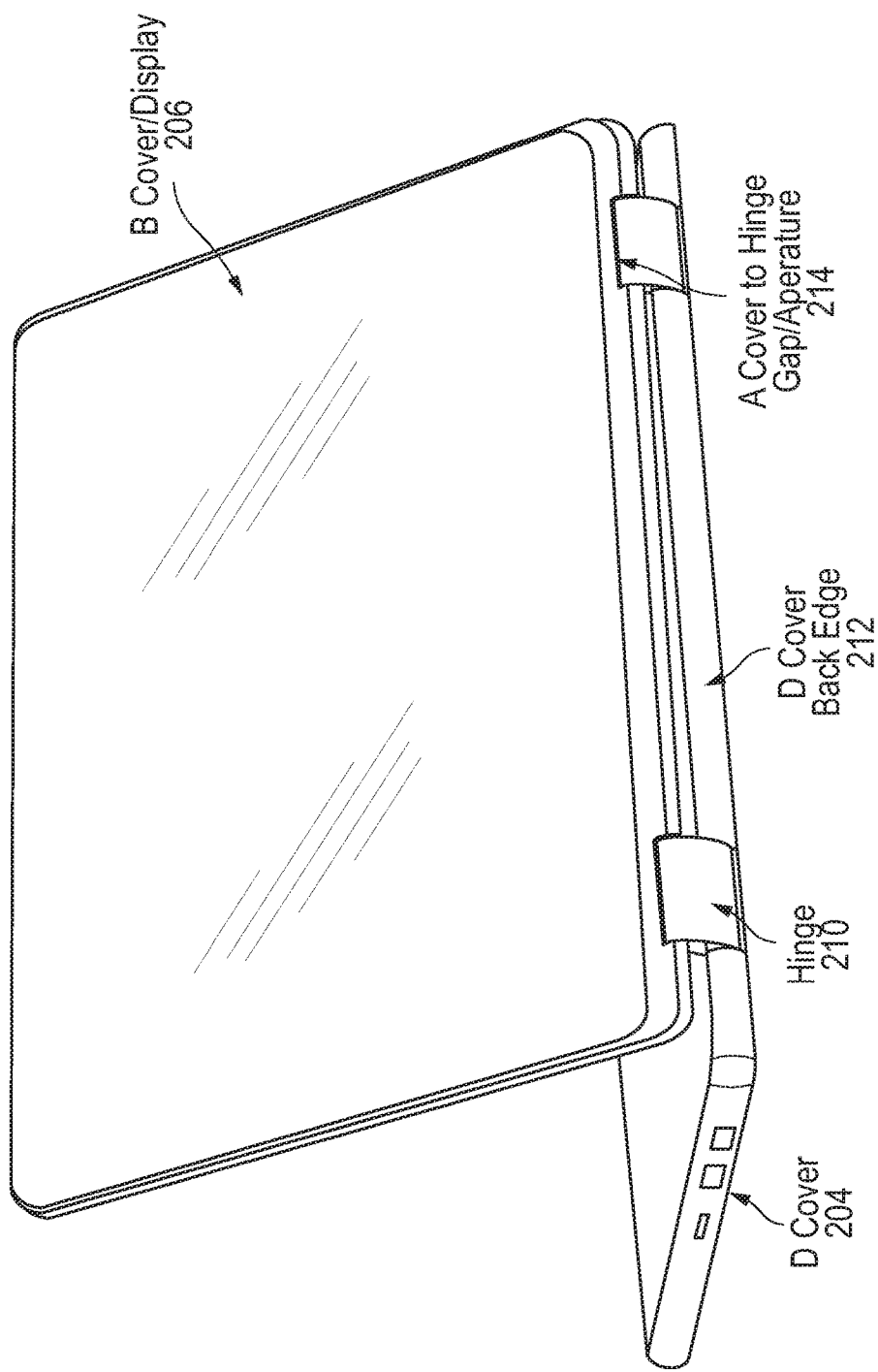
FIG. 2C is a graphical illustration of a metal chassis placed in the tablet configuration according to an embodiment of the present disclosure.

FIG. 2C is a graphical illustration of a metal chassis including a base chassis and lid chassis placed in the tablet configuration according to an embodiment of the present disclosure. As shown in FIG. 2C, the lid chassis including the A cover and the B cover 206 may be joined to the base chassis including the C cover and the D cover 204 via one or more hinges 210. The hinge 210 in an embodiment may be capable of placing the lid chassis and base chassis in a plurality of positional configurations with respect to one another, including, but not limited to the open, closed, and tablet configurations described herein. Taking the closed configuration as a reference position of the lid chassis including the A cover and the B cover 206 and the base chassis including the C cover and the D cover 204, the hinge 210 may allow for a 180 degree or greater rotation of the lid chassis to place the lid chassis and base chassis in the tablet configuration. For example, as shown in FIG. 2C, the lid chassis including the A cover and the B cover 206 in an embodiment may rotate greater than 180 degrees and up to nearly 360 degrees such that the video display of the B cover 206 may face toward the user and the keyboard of the C cover 208 may face away from the user. If the lid chassis including the A cover and the B cover 206 are rotated to almost 360 degrees from the closed configuration, the A cover 202 may abut the D cover 204.

Figure 3:
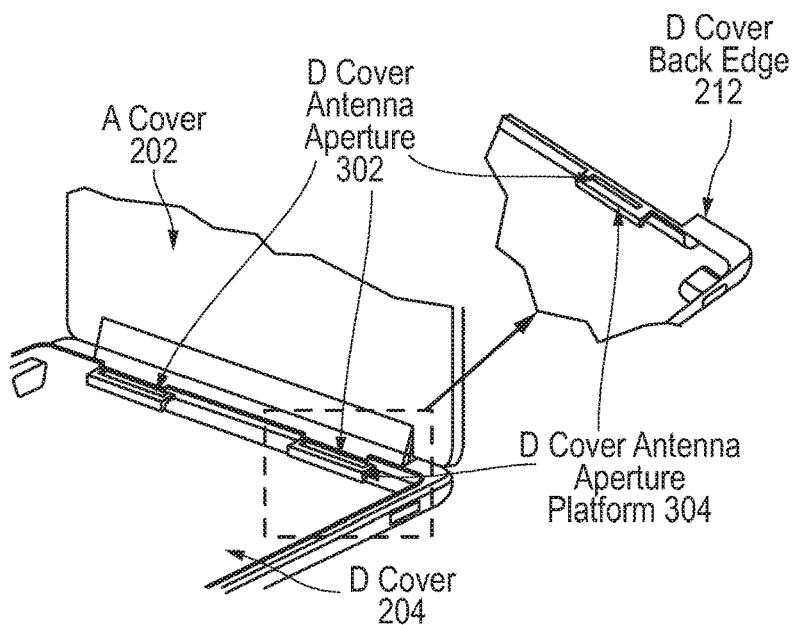
FIG. 3 is a graphical illustration of a base chassis antenna aperture according to an embodiment of the present disclosure.

FIG. 3 is a graphical illustration of a base chassis antenna aperture formed in the D cover, prior to joining the D cover with the C cover according to an embodiment of the present disclosure. FIG. 3 shows the D cover 204 prior to its joining with the C cover, and the A cover 202 prior to its joining with the B cover, as described above. As shown in FIG. 3, the D cover 204 may further include one or more antenna aperture platforms 304. Each antenna aperture platform 304 in an embodiment may extend from the back edge 212 of the D cover 204. In an embodiment, the D cover antenna apertures 302 may be formed from the same metallic material used to create the D cover 204. As also shown in FIG. 3, a D cover antenna aperture 302 may be disposed within one or more of the D cover antenna aperture platforms 304. Each of the D cover antenna apertures 302 may be located directly above the position within the D cover 204 in which a transmitting antenna may be placed. The D cover antenna apertures 302 in an embodiment may be formed by machining a slot throughout the thickness of the D cover antenna aperture platform 304 with, for example, a T-cutter, or any other machining tool capable of forming such a slot as used in the art.

In such a way, the A cover and D cover in embodiments of the present disclosure may be manufactured from fully metallic components. Many small form factor outer cases for information handling systems currently employ chasses that include both metallic and plastic components. For example, plastic components that are radio-frequency (RF) transparent may be used to form the portion of a chassis under which an RF transmitting antenna may be placed. Chasses in such scenarios often involve more parts than chasses not including plastic portions. Further, the plastic portions included may be more expensive to machine than aluminum alloy metals, and may require intricate multi-step processes for integrating the metal and plastic parts into a single chassis. Embodiments of the present disclosure may decrease the complexity and cost of creating chasses for information handling systems by forming the outer chassis entirely of metal and removing any additional RF transparent plastic windows from the chassis design.

Figure 4:
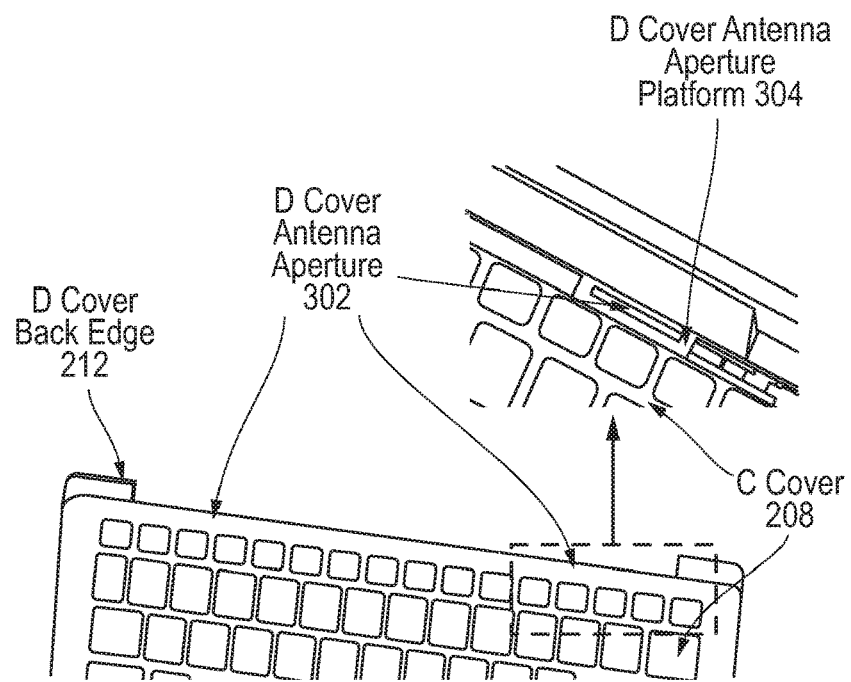
FIG. 4 is a graphical illustration of a base chassis antenna aperture according to an embodiment of the present disclosure.

FIG. 4 is a graphical illustration of a base chassis antenna aperture formed in the D cover antenna aperture platform 304, following the joining of the D cover with the C cover according to an embodiment of the present disclosure. FIG. 4 shows the D cover antenna aperture 302 in an embodiment lying directly between the keyboard portion of the C cover 208 and the D cover back edge 212. As shown in FIG. 4, portions of the keyboard in an embodiment may abut the D cover antenna aperture platform 304 within which the D cover antenna aperture 302 is disposed. As such, when interacting with upper portions of the keyboard, the user's hands may come into close contact with a transmitting antenna located directly beneath the D cover antenna aperture 302 in an embodiment. Such close contact may require the RF input power supplied to the transmitting antenna in an embodiment to be regulated in order to decrease the SAR of the signal emitted by the antenna. A proximity sensing element (not shown) in an embodiment may be co-located with the transmitting antenna in order to sense the presence of a user's hand interacting with the keyboard, or approaching the transmitting antenna for any other reason.

Figure 5A:
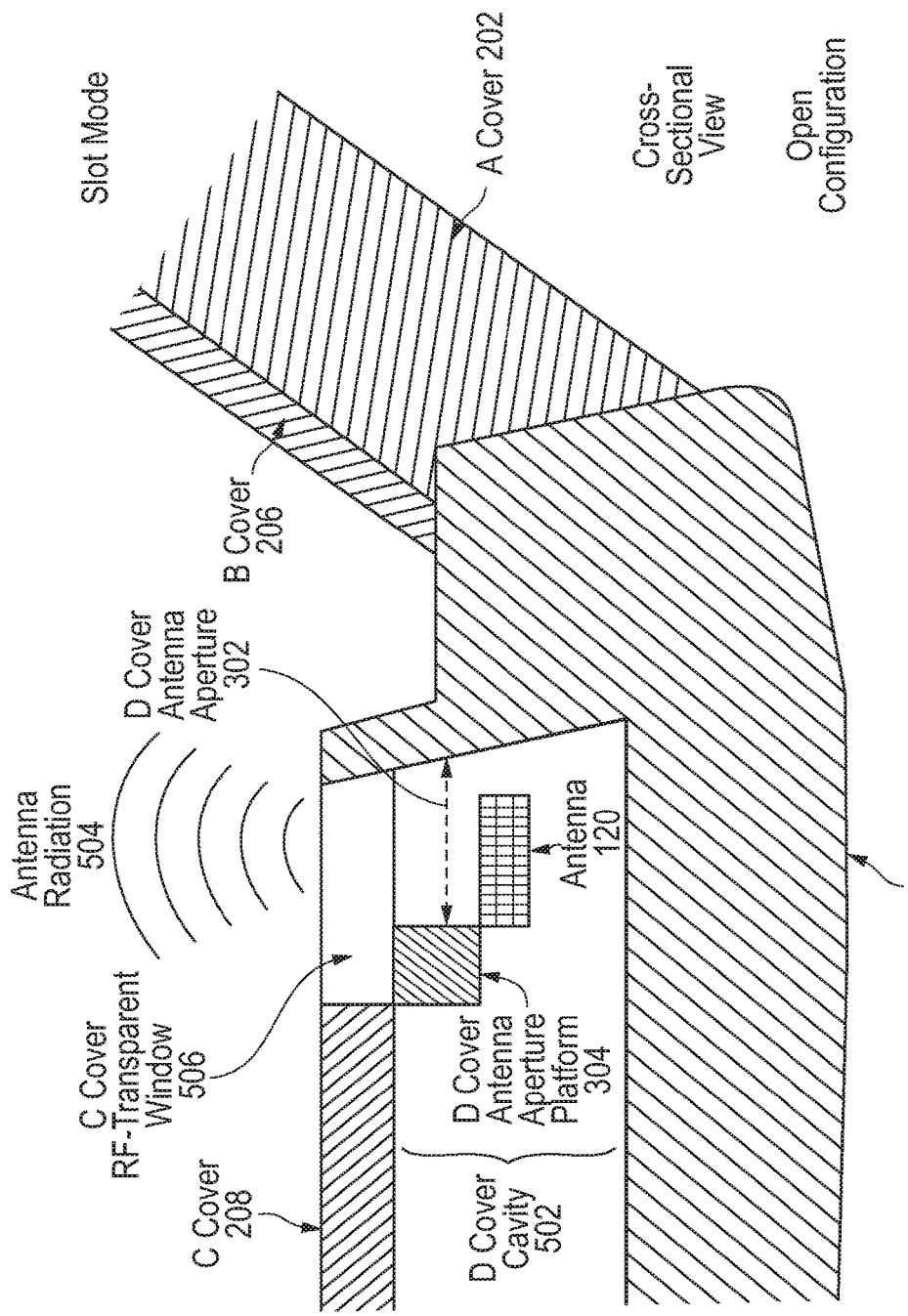
FIG. 5A is a cross-sectional line drawing of a side view of an information handling system small form factor case placed in an open configuration according to an embodiment of the present disclosure.

FIG. 5A is a cross-sectional line drawing of a side view of an information handling system small form factor case manufactured according to a slot mode, placed in an open configuration according to an embodiment of the present disclosure. As can be seen in FIG. 5A, the small form factor case for the information handling system in an embodiment may include the A cover 202, the B cover 206, the C cover 208, and the D cover 204. The A cover 202 and the B cover 206 in an embodiment may form a lid chassis for the information handling system, while the C cover 208 and the D cover 204 may form a base chassis for the information handling system. As shown in FIG. 5A, the form factor case for the information handling system may be placed in an open configuration such that the lid chassis including the A cover 202 and the B cover 206 is situated at an angle with respect to the base chassis including the C cover 208 and the D cover 204. For example, the A cover 202 and the B cover 206 as shown in FIG. 5A may be rotated by an angle between 10 degrees and 180 degrees from the positions of the C cover 208 and the D cover 204.

In an embodiment, the C cover and D cover may be joined together so as to form a D cover cavity 502. One or more transmitting antenna 120 may be disposed within the D cover cavity 502 in an embodiment. The transmitting antenna 120 in some embodiments may include an aperture antenna. The transmitting antennas in an embodiment may include high-band, medium-band, low-band, and unlicensed band transmitting antennas. Alternatively, embodiments may include a single transceiving antenna capable of receiving and transmitting, and/or more than one transceiving antennas. Each of the antennas, such as antenna 120 included in the information handling system in an embodiment may be subject to the FCC regulations on specific absorption rate (SAR). The transmitting antenna in some embodiments may be an aperture antenna. Aperture antennas in embodiments of the present disclosure may be a highly effective improvement on wireless antennas employed in previous information handling systems.

A transmitting antenna 120 in an embodiment may be placed within the D cover 204, directly beneath the D cover antenna aperture 302, such that the antenna radiation 504 is emitting through the D cover antenna aperture 302 disposed within the D cover antenna aperture platform 304. Some embodiments may further include an RF-transparent window 506 overlaying the D cover antenna aperture 302 and the D cover antenna aperture platform 304. In an embodiment in which the transmitting antenna 120 is an aperture antenna, the transmitting antenna 120 may be operably connected to the D cover antenna aperture platform 304, which may act as an excitable structure for the transmitting antenna 120. Further, the surrounding portion of the D cover 204 in such an embodiment may act as the ground plane of the transmitter 120. Such a method of placing an aperture antenna beneath a machined antenna aperture may exclude the integration of any RF transparent plastic windows within the outer chassis including the A cover and the D cover, thus decreasing the complexity and cost of manufacture.

Figure 5B:
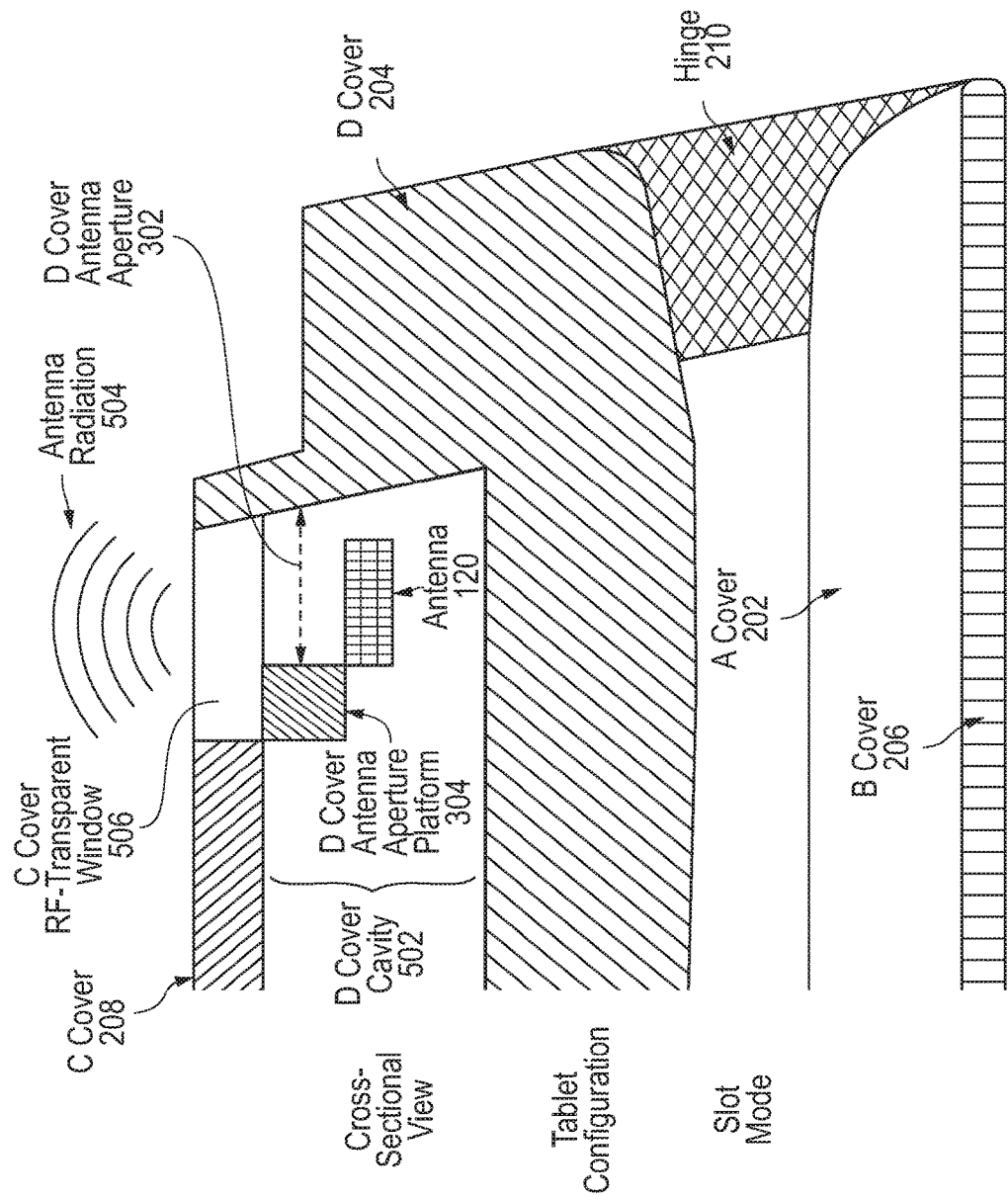
FIG. 5B is a cross-sectional line drawing of a side view of an information handling system small form factor case placed in a tablet configuration according to an embodiment of the present disclosure.

FIG. 5B is a cross-sectional line drawing of a side view of an information handling system small form factor case manufactured according to a slot mode, placed in a tablet configuration according to an embodiment of the present disclosure. The information handling system in an embodiment may include a hinge 210, as shown in FIG. 5B. The hinge 210 in an embodiment may operably connect the D cover 204 and the A cover 202 such that the A cover 202 and the D cover 204 may rotate with respect to one another. In an example embodiment, hinge 210 may allow the A cover 202 to lie flush with the D cover 204 (e.g. rotated zero degrees from the D cover 204) according to a closed position, to rotate between zero and 180 degrees from the D cover 204 according to an open configuration, and, as shown in FIG. 5B, to rotate between 180 degrees and 360 degrees from the D cover 204 according to a tablet configuration.

As shown in FIG. 5B, the form factor case for the information handling system may be placed in a tablet configuration such that lid chassis including the A cover 202 and the B cover 206 is situated at an angle with respect to the base chassis including the C cover 208 and the D cover 204 such that the user may interact directly with the B cover 206 without requiring the use of the keyboard or other control interfaces housed in the C cover 208. For example, the A cover 202 and the B cover 206 as shown in FIG. 5A are rotated by an angle measuring roughly 360 degrees from the positions of the C cover 208 and the D cover 204, placing the A cover 202 and the B cover 206 roughly parallel with and directly beneath the C cover 208 and the D cover 204. In a tablet configuration, in an embodiment, a user may flip the information handling system as shown in FIG. 5B upside down, such that the user may interact with and see a digital video display (e.g. touch sensitive display) housed within the B cover 206.

The transmitting antenna 120 housed within the D cover cavity 502 of an information handling system placed in a tablet configuration in an embodiment may transmit antenna radiation 504 outward from the surface of the C cover 208. For example, as shown in FIG. 5B, the transmitting antenna 120 may emit antenna radiation 504 through the D cover antenna aperture 302 disposed within the D cover antenna aperture platform 304. In another aspect, the antenna radiation 504 may further transmit through an RF-transparent window 506 disposed above the D cover antenna aperture platform 304, between the C cover 208 and the D cover 204 back edge 212.

Figure 5C:
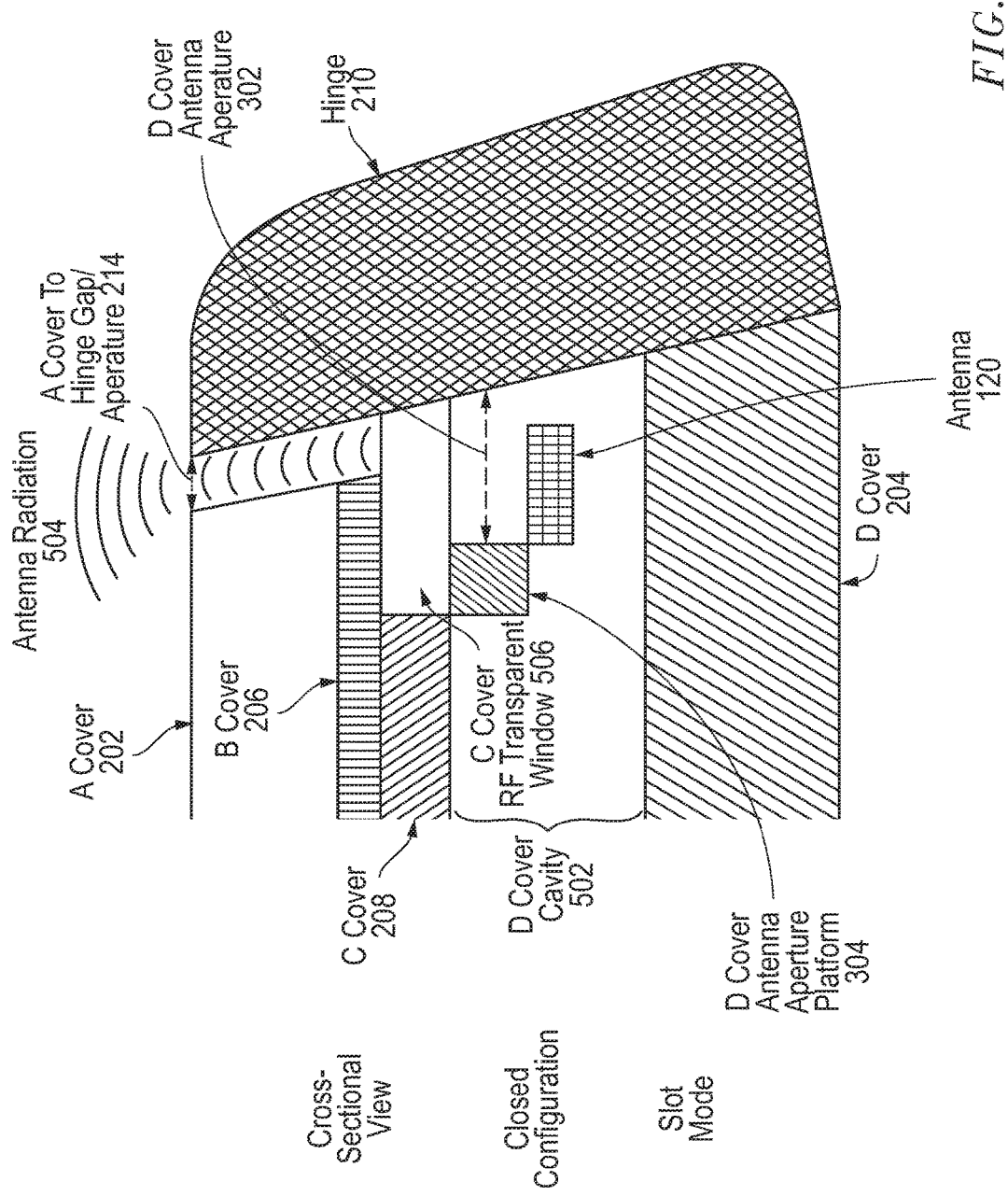
FIG. 5C is a cross-sectional line drawing of a side view of an information handling system small form factor case placed in a closed configuration according to an embodiment of the present disclosure.

FIG. 5C is a cross-sectional line drawing of a side view of an information handling system small form factor case manufactured according to a slot mode, placed in a closed configuration according to an embodiment of the present disclosure. As described herein, hinge 210 in an embodiment may allow the A cover 202 to lie substantially parallel to the D cover 204 (e.g. rotated zero degrees from the D cover 204) according to a closed position as shown in FIG. 5C.

As shown in FIG. 5C, the form factor case for the information handling system may be placed in a closed configuration such that the B cover 206 abuts the C cover 208 and a portion of the D cover 204. In such a configuration, the A cover 202 and the D cover 204 may form an exterior or outer shell to protect the interior contents of the information handling system, as well as the digital display housed within the B cover 206 and the keyboard and other cursor control devices housed within the C cover 208 from outside forces. While situated in the closed configuration, a user may still interact with the information handling system in an embodiment via external control and display devices, such as an external wired video display (e.g. via HDMI access), a wireless or Bluetooth external video display, via a Bluetooth external control devices (e.g. wireless keyboard or mouse). In still other embodiments, the information handling system may be passively operating without any direct interaction with the user. In both of these scenarios, the user may intend for the information handling system to continue to maintain wireless communications via the transmitting antenna 120. For example, if a user is operating the information handling system according to the closed configuration in an embodiment while streaming video to an external video display, the user may intend to continue viewing the streamed content while the information handling system remains in the closed configuration, requiring continued transmission of and receipt of the data signal containing the streaming content via the antenna 120.

When the covers A-D are placed in the closed configuration, the transmitting antenna 120 may transmit the communications signal directly toward the lid chassis including the A cover 202 and the B cover 206 lying substantially parallel to the base chassis including the C cover 208 and the D cover 204 (e.g. The A cover oriented at an angle less than ten degrees from the D cover), as shown in FIG. 5C. Without a route for the antenna radiation 504 to reach beyond the A cover 202 and the B cover 206, continued transmission from antenna 120 would not be possible when the information handling system is placed in a closed configuration. One potential solution to this issue would include placing one or more the transmitting antennas within the lid chassis (e.g. between the A cover 202 and the B Cover 206). Such a solution would involve increasing the weight and thickness of the lid chassis including the A cover 202 and the B cover 206, making the information handling system the B cover bulkier and less stream-lined, which current consumers find unappealing. A process that allows the communications signal to propagate through the lid chassis including the A cover 202 and the B cover 206 when the information handling system is placed in the closed configuration without placement of an antenna within the lid chassis is needed. Such a process may include configuring the small form factor case for the information handling system such that the antenna radiation 504 may transmit through a gap or secondary aperture 214 disposed between the A cover 202 and the hinge 210 in an embodiment when the A-D covers are placed in a closed configuration. For example, as shown in FIG. 5C, the gap or aperture 214 between the A cover 202 and the hinge 210 in an embodiment may be disposed such that antenna radiation 504 emitted from transmitting antenna 120 may transmit through a D cover antenna aperture 302 within a D cover antenna aperture platform 304, through a C cover RF-transparent window 506, through the gap or secondary aperture 214 between the A cover 202 and the hinge 210, and outward from the top exterior surface of the A cover 202.

In such a way, the outer chassis including the A cover 202 and the D cover 204 in embodiments of the present disclosure may be manufactured from fully metallic components. Many small form factor outer cases for information handling systems currently employ chasses that include both metallic and plastic components. For example, plastic components that are radio-frequency (RF) transparent may be used to form the portion of the outer chassis under which an RF transmitting antenna may be placed. Chasses in such scenarios often involve more parts than chasses not including plastic portions. Further, the plastic portions included may be more expensive to machine than aluminum alloy metals, and may require intricate multi-step processes for integrating the metal and plastic parts into a single chassis. Embodiments of the present disclosure may decrease the complexity and cost of creating chasses for information handling systems by forming the outer chassis entirely of metal and removing any additional RF transparent plastic windows from the chassis design, or integrating RF-transparent windows within the interior portions of the chassis (e.g. at the joint between the C cover and the D cover).

Figure 5D:
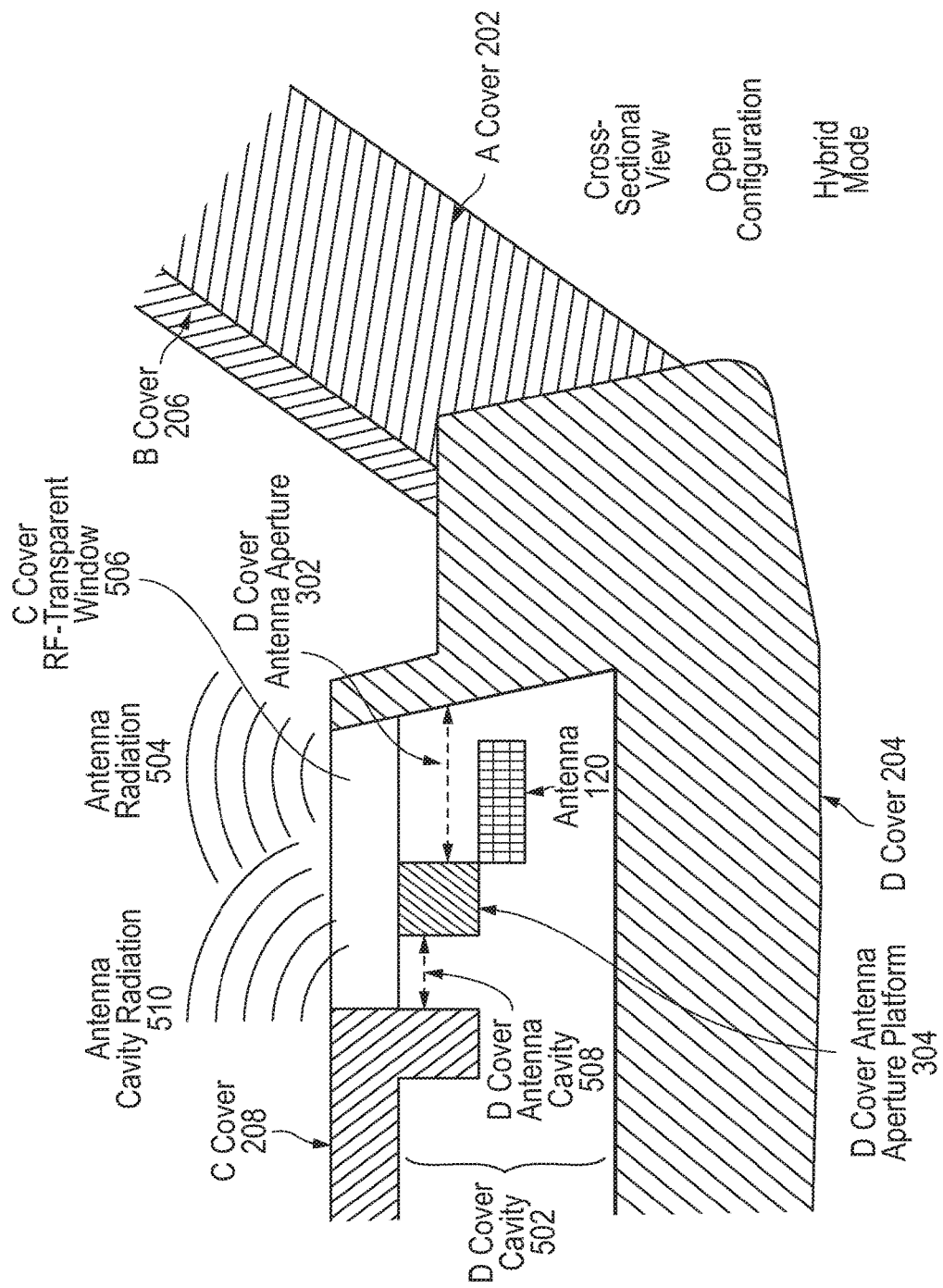
FIG. 5D is a cross-sectional line drawing of a side view of an information handling system small form factor case including a hybrid slot/cavity mode according to an embodiment of the present disclosure.

FIG. 5D is a cross-sectional line drawing of a side view of an information handling system small form factor case including a hybrid slot/cavity mode structure, placed in an open configuration according to an embodiment of the present disclosure. As described herein, the D cover antenna aperture platform 304 in an embodiment may act as an excitation structure for the communications signal transmitted from antenna 120. In such embodiments, the antenna radiation 504 may be emitted from the left and right walls of the D cover antenna aperture platform 304 as shown in FIG. 5D. For example, the antenna radiation 504 may be emitted from the right wall of the D cover antenna aperture platform 304, through the D cover antenna aperture 302 in an embodiment, while simultaneously being emitted from the left wall of the D cover antenna aperture platform 304 situated nearby the C cover 208. In the slot mode described herein, the left wall of the D cover antenna aperture platform 304 may be situated directly beneath the C cover 208 or close enough to the C cover 208 such that the C cover 208 blocks transmission of the antenna radiation 504 from the left wall of the D cover antenna aperture platform 304 to the environment directly above the C cover 208. In contrast, the left wall of the D cover antenna aperture platform 304 in an embodiment operating according to the hybrid mode may be situated such that a D cover antenna cavity 508 is disposed between the left wall of the D cover antenna aperture platform 304 and the C cover 208. In such an embodiment, the transmitting antenna 120 may emit radiation 504 through the D cover antenna aperture 302, and may additionally emit antenna radiation 510 through the D cover antenna cavity 508.

When operating in the hybrid mode, the space between the transmitting antenna 120 and the C cover 208, which is most likely to be in direct contact with a human body part, is increased in comparison to the slot mode. Because the transmitting antenna 120 is located further from the portion of the information handling system most likely to come into close contact with human body parts in the hybrid mode, fewer reductions in transmitting antenna 120 power are anticipated in order to comply with FCC SAR regulations.

Further, when operating according to the slot mode, the antenna radiation 504 emitted by the transmitting antenna 120 and excited by the D cover antenna aperture platform 304 may be emitted non-uniformly, such that a hot spot may form along the left wall of the D cover antenna aperture platform 304 nearest the C cover 208. In contrast, when operating according to the hybrid mode, the antenna radiation may be more evenly distributed along and around the D cover antenna aperture platform 304. In such an embodiment, the radiation emitted at any given point across the width of the D cover antenna aperture platform 304 and the transmitting antenna 120 decreases, since the radiation is being emitted uniformly across both structures. As a result, the SAR of the antenna radiation 504 emitted through the D cover antenna aperture 302 in a hybrid mode may be lower than the SAR of the same signal transmitted from a transmitting antenna 120 operating in the slot mode. Similarly, the SAR of the antenna radiation 510 emitted through the D cover antenna cavity 508 in a hybrid mode may be lower than the SAR of the antenna radiation 504 emitted through a D cover antenna aperture 302 in a slot mode.

When a human body part is detected nearby antenna 120, the processor (not shown) may instruct the integrated circuit (not shown) to lower the power supplied to antenna 120 in order to decrease the SAR of the signal transmitted to the FCC required maximum allowable SAR value. A configuration that results in a lower SAR at a given power level would require a smaller decrease in power level to reach the FCC mandated acceptable SAR level than a configuration that results in a higher SAR at the same power level. Because the SAR of both or either the antenna radiation 504 or the antenna cavity radiation 508 in a hybrid mode may be lower than the SAR of a signal transmitted with the same power via only the D cover antenna aperture 302 according to the slot mode, the integrated circuit included within a case manufactured according to the hybrid slot/cavity mode may need to decrease the power supplied to the antenna 120 by a smaller percentage than it would need to if it were included within a case manufactured according to the slot mode. In other words, the antenna 120 incorporated within a case manufactured according to the hybrid slot/cavity mode may receive more power than an antenna incorporated with a case manufactured according to the slot mode, while still complying with the FCC SAR regulations. The higher power levels supplied to antenna 120 incorporated within a case manufactured according to the hybrid slot/cavity mode may allow the antenna 120 to transceive stronger (e.g. higher quality) signals when a nearby human body part is detected than an antenna housed within a case manufactured according to the slot mode.

Figure 6A:
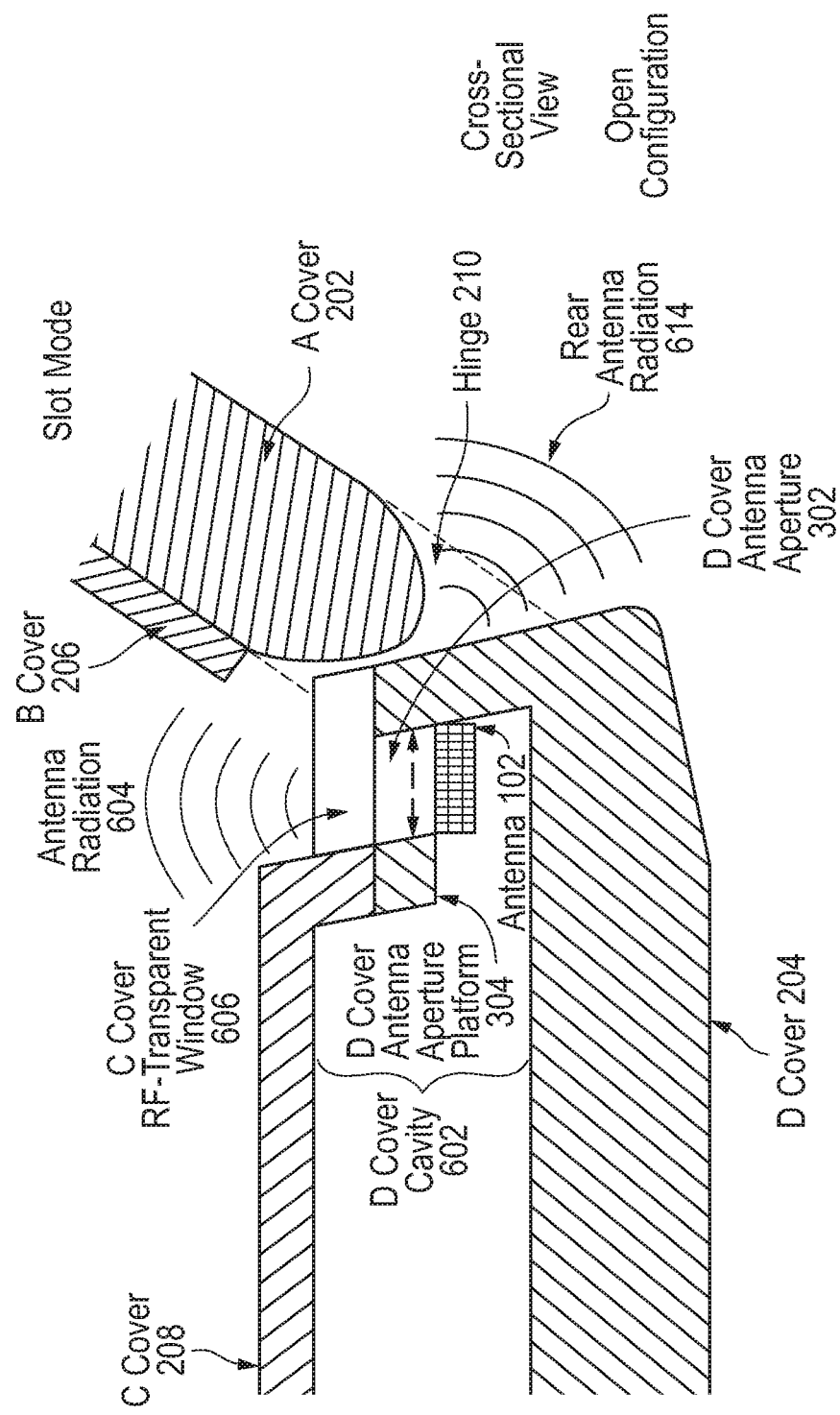
FIG. 6A is a cross-sectional line drawing of a side view of an information handling system small form factor case placed in an open configuration according to another embodiment of the present disclosure.

FIG. 6A is a cross-sectional line drawing of a side view of an information handling system small form factor case manufactured according to a slot mode, placed in an open configuration according to another embodiment of the present disclosure. In embodiments, as described above with reference to FIGS. 5A-5D, the D cover antenna aperture platform 304 may be located the same distance away from the left and right sides of the case as the hinges, such that a cross-sectional view cut through the D cover antenna aperture platform 304 also cuts through the hinge 210. In embodiments such as with FIGS. 6A-6D, the D cover antenna aperture platforms 304 may be located closer together to one another than the hinges 210 are to one another. In other words, the D cover antenna aperture platforms 304 in such embodiments may be located a longer distance away from the left and right sides of the case as the hinges, such that the D cover antenna aperture platform 304 does align with the hinge 210. FIGS. 6A-6D describe such an embodiment. As such, each of FIGS. 6A-6D do not include a cross-sectional view of the hinge(s) 210, but provide a dashed line outline of where the hinge 210 would be located behind or in front in a cross-sectional view co-planar with the cross-sectional views of 6A-6D taken at a greater or lesser depth across the hinge 210.

In an embodiment in which the D cover antenna aperture platform 304 does not line up with the hinge 210, as shown in FIG. 6A, the C cover RF-transparent window 606 may extend to the rear edge of the D cover 204. In such an embodiment, the antenna 120 may be placed closer to the rear edge of the D cover 204 than in an embodiment described with respect to FIGS. 5A-5D. As shown in FIG. 6A, the C cover 208 in such an embodiment may overlay the D cover antenna aperture platform 304, and abut the C cover RF-transparent window 606. In contrast to the substantially planar C cover 208 shown in an embodiment described with respect to FIGS. 5A-5D, the C cover 208 in an embodiment described with respect to FIGS. 6A-6D may have a vertically stepped cross section, such that a portion of the C cover 208 lies vertically higher or further away from the D cover 204 than the C cover RF-transparent window 606. As such, the D cover cavity 602 in such an embodiment may be larger than the D cover cavity in an embodiment described with reference to FIGS. 5A-5D. Such an embodiment may allow for emission of antenna radiation 604 closer to the rear edge of the D cover 204 than in an embodiment described with reference to FIGS. 5A-5D. As is described, in a closed position, the antenna radiation 614 may then be transmitted between the D cover 204 and the A cover 202 while still transmitting antenna radiation 604 in an open configuration up through the C cover transparent window 606.

As shown in FIG. 6A, in an embodiment, the rear edge of the A cover 202 may have a curvilinear cross-sectional shape. The B cover 206 in such an embodiment may join the A cover 202 not at the rear edge of the A cover 202, but rather, at the portion of the A cover 202 having a planar, rather than curvilinear cross-sectional shape. As shown in FIG. 6A, the form factor case for the information handling system may be placed in an open configuration such that the lid chassis including the A cover 202 and the B cover 206 is situated at an angle with respect to the base chassis including the C cover 208 and the D cover 204. For example, the A cover 202 and the B cover 206 as shown in FIG. 6A may be rotated by an angle between 10 degrees and 180 degrees from the positions of the C cover 208 and the D cover 204.

Figure 6B:
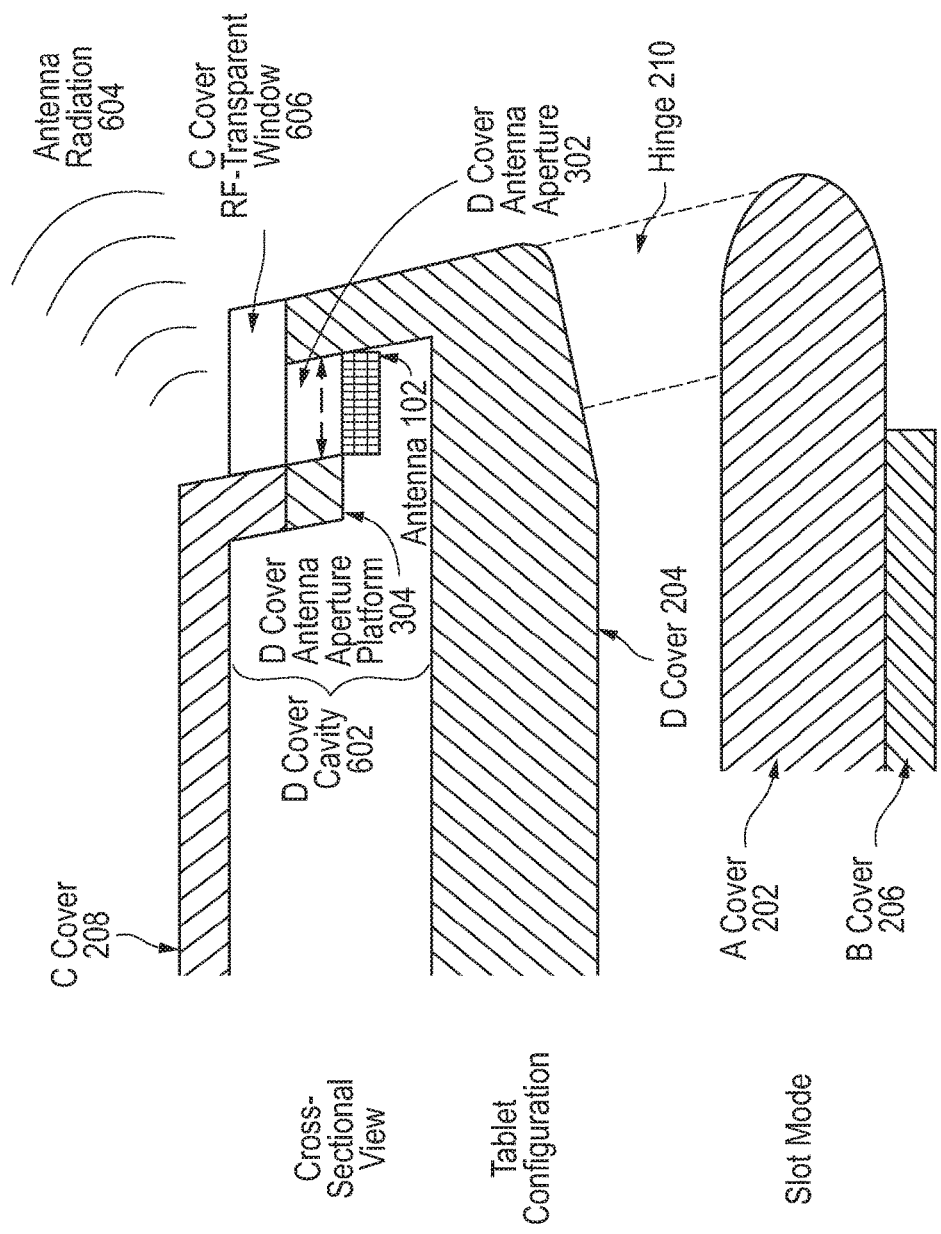
FIG. 6B is a cross-sectional line drawing of a side view of an information handling system small form factor case placed in a tablet configuration according to another embodiment of the present disclosure.

FIG. 6B is a cross-sectional line drawing of a side view of an information handling system small form factor case manufactured according to a slot mode, placed in a tablet configuration according to an embodiment of the present disclosure. The hinge 210 in an embodiment may operably connect the D cover 204 and the A cover 202 such that the A cover 202 and the D cover 204 may rotate with respect to one another. In an example embodiment, hinge 210 may allow the A cover 202 to lie flush with the D cover 204 (e.g. rotated zero degrees from the D cover 204) according to a closed position, to rotate between zero and 180 degrees from the D cover 204 according to an open configuration, and, as shown in FIG. 6B, to rotate between 180 degrees and 360 degrees from the D cover 204 according to a tablet configuration.

As shown in FIG. 6B, the form factor case for the information handling system may be placed in a tablet configuration such that lid chassis including the A cover 202 and the B cover 206 is situated at an angle with respect to the base chassis including the C cover 208 and the D cover 204 such that the user may interact directly with the B cover 206 without requiring the use of the keyboard or other control interfaces housed in the C cover 208. For example, the A cover 202 and the B cover 206 as shown in FIG. 6A are rotated by an angle measuring roughly 360 degrees from the positions of the C cover 208 and the D cover 204, placing the A cover 202 and the B cover 206 roughly parallel with and directly beneath the C cover 208 and the D cover 204. In a tablet configuration, in an embodiment, a user may flip the information handling system as shown in FIG. 6B upside down, such that the user may interact with and see a digital video display (e.g. touch sensitive display) housed within the B cover 206.

In an embodiment in which the D cover antenna aperture platform 304 does not line up with a hinge 210, as shown in FIG. 6B, the antenna 120 and C cover RF-transparent window 606 may be located closer to the rear edge of the D cover 204 than similar structures shown in FIGS. 5A-5D. Because the antenna 120 and C cover RF-transparent window 606 in such an embodiment may be located closer to the rear edge of the D cover 204, the antenna radiation 604 may be emitted over a wider cross-sectional area. For example, the antenna radiation 604 in such an embodiment may be emitted perpendicularly from the surface of the C cover RF-transparent window 606, as well as at an angle toward the rear edge of the D cover 204.

Figure 6C:
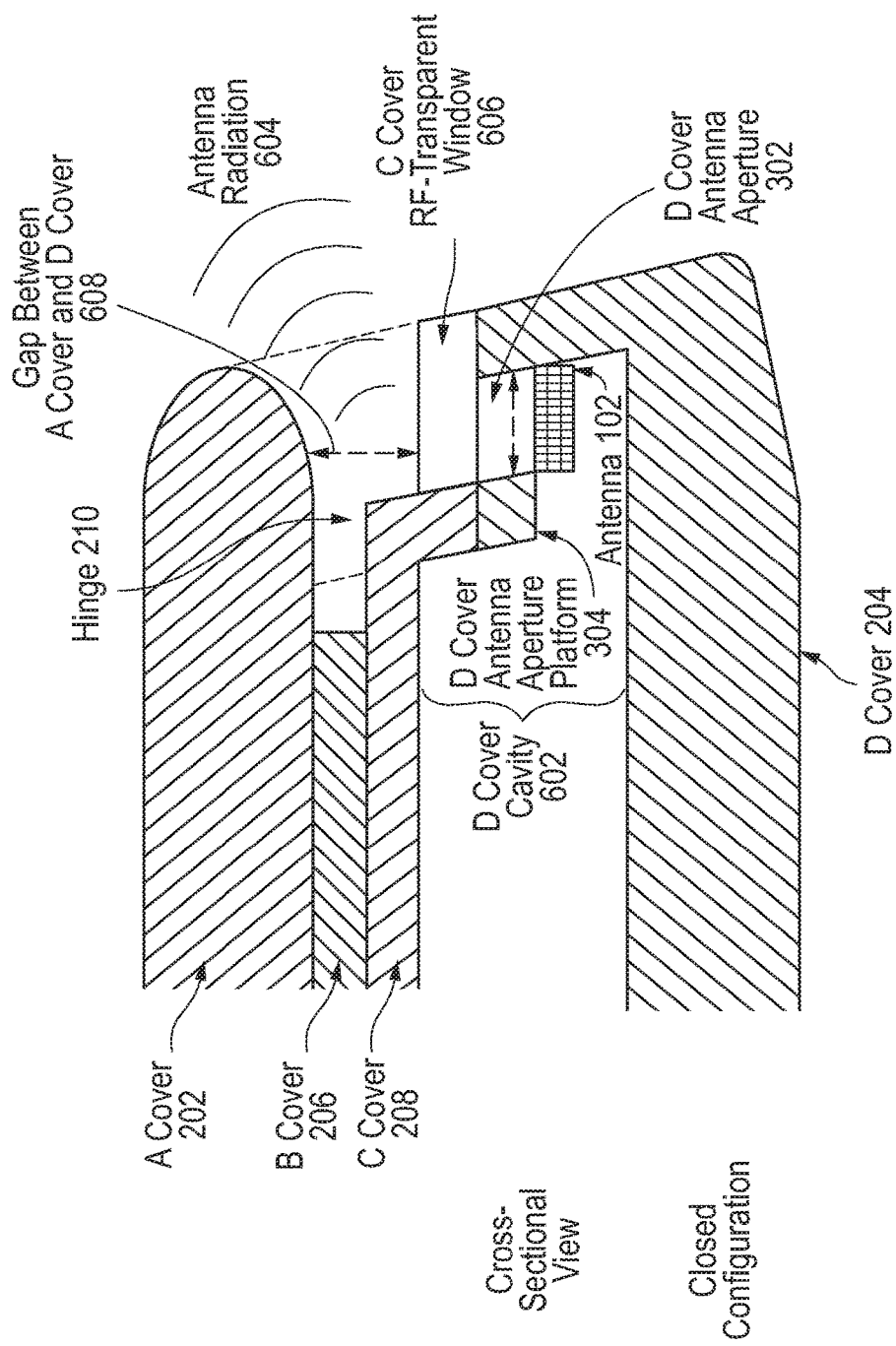
FIG. 6C is a cross-sectional line drawing of a side view of an information handling system small form factor case placed in a closed configuration according to another embodiment of the present disclosure.

FIG. 6C is a cross-sectional line drawing of a side view of an information handling system small form factor case manufactured according to a slot mode, placed in a closed configuration according to an embodiment of the present disclosure. As described herein, hinge 210 in an embodiment may allow the A cover 202 to lie substantially parallel to the D cover 204 (e.g. rotated zero degrees from the D cover 204)

according to a closed position as shown in FIG. 6C. The curvilinear nature of the rear edge of the A cover 202 in an embodiment may allow for emission of antenna radiation 604 via the rear edge of the information handling system in an embodiment.

As shown in FIG. 6C, the form factor case for the information handling system may be placed in a closed configuration such that the B cover 206 abuts the C cover 208 and a portion of the D cover 204. In such a configuration, the A cover 202 and the D cover 204 may form an exterior or outer shell to protect the interior contents of the information handling system, as well as the digital display housed within the B cover 206 and the keyboard and other cursor control devices housed within the C cover 208 from outside forces.

In an embodiment in which the D cover antenna aperture platform 304 does not line up with a hinge 210, the rear edge of the A cover 202 may have a curvilinear cross-section, as shown in FIG. 6C. In such an embodiment, when the covers A-D 202-208 are placed in the closed configuration, a gap 608 may be formed between the A cover 202 and the D cover 204. Because the antenna 120 and C cover RF-transparent window 606 in such an embodiment may be located closer to the rear edge of the D cover 204, the antenna radiation 604 may be emitted via the antenna aperture platform 304 and through the C cover RF-transparent window 606, as well as at an angle toward the rear edge of the D cover 204. Thus, the antenna radiation 604 may be emitted through the gap 608 between the A cover 202 and the D cover 204 in such an embodiment, even when the covers A-D 202-208 are placed in the closed configuration. In such a way, the outer chassis including the A cover 202 and the D cover 204 in embodiments of the present disclosure may be manufactured from fully metallic components. In some embodiments (not shown), the D cover antenna aperture platform 304 may be tilted at an angle toward the rear edge of the D cover 204 to maximize the transmission of antenna radiation 604 through gap 608 by the aperture antenna formed with the antenna aperture platform 304. The non-alignment with hinge aspects permits transmission through gap 608 toward the rear edge of the D-cover 204. The tilt angle of antenna aperture platform 304 may be selected such that minimal directional impact on transmission up from the C cover 208 during open configuration is experienced. For example, it can be appreciated that a tilt angle of 1 to 45 degrees up from the parallel with the C cover surface may be used in some embodiments depending on hinge 210 structure and operation. Embodiments of the present disclosure may decrease the complexity and cost of creating chasses for information handling systems by forming the outer chassis entirely of metal and removing any additional RF transparent plastic windows from the chassis design, or integrating RF-transparent windows within the interior portions of the chassis (e.g. at the joint between the C cover and the D cover).

Figure 6D:
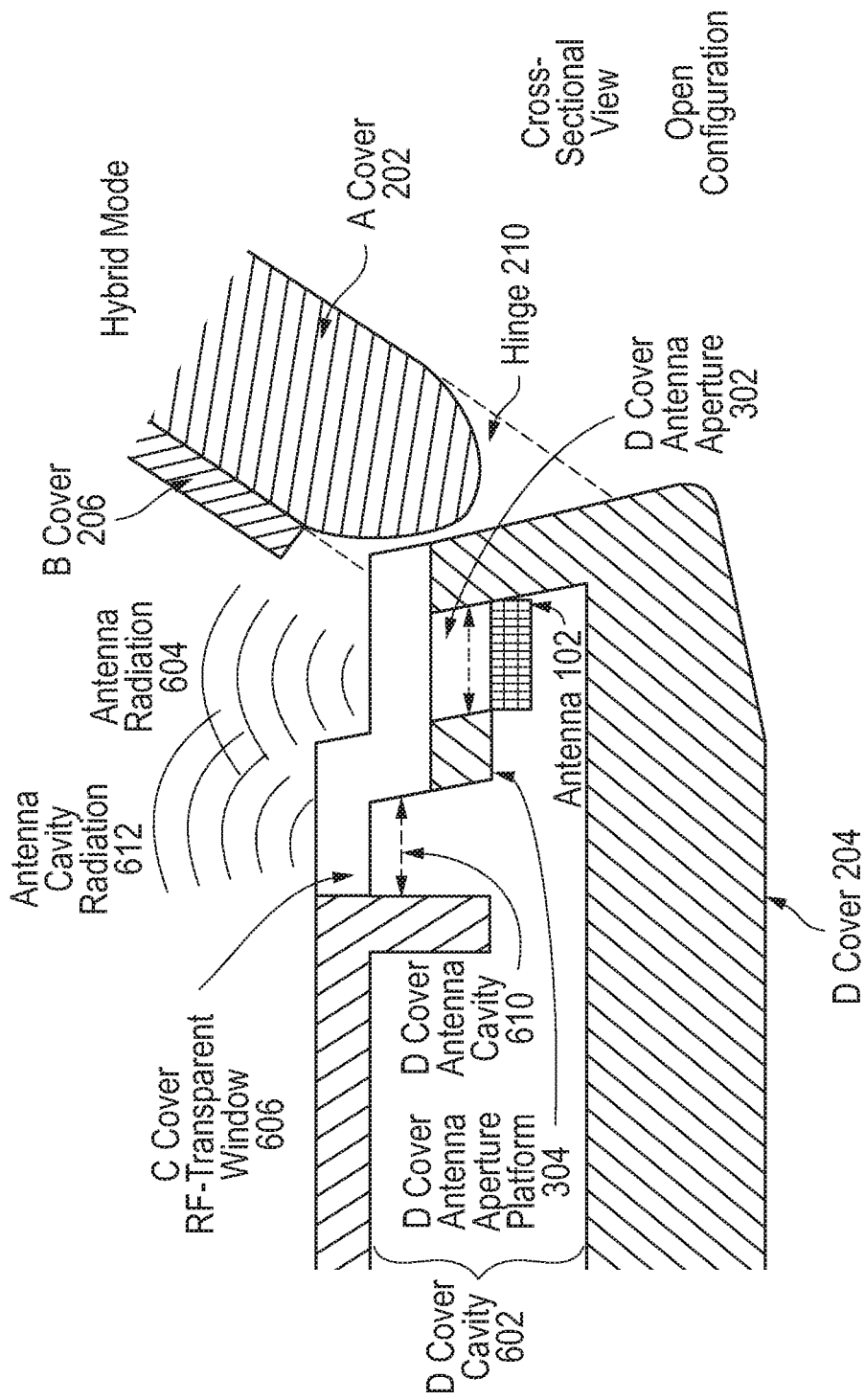
FIG. 6D is a cross-sectional line drawing of a side view of an information handling system small form factor case including a hybrid slot/cavity mode according to an embodiment of the present disclosure.

FIG. 6D is a cross-sectional line drawing of a side view of an information handling system small form factor case manufactured according to a hybrid slot/cavity mode, placed in an open configuration according to an embodiment of the present disclosure. As described herein, the D cover antenna aperture platform 304 in an embodiment may act as an excitation structure for the communications signal transmitted from antenna 120. In such embodiments, the antenna radiation 604 may be emitted from the left and right walls of the D cover antenna aperture platform 304 as shown in FIG. 6D. For example, the antenna radiation 604 may be emitted from the right wall of the D cover antenna aperture platform 304, through the D cover antenna aperture 302 in an embodiment, while simultaneously being emitted from the left wall of the D cover antenna aperture platform 304 situated nearer the C cover 208. D cover antenna aperture platform 304 may also have a tilt angle toward the rear edge of D cover 204 to assist with transmission during closed configuration according to some embodiments.

The C cover 208 in an embodiment described with respect to FIGS. 6A-6D may have a vertically stepped cross section, such that a portion of the C cover 208 lies vertically higher or further away from the D cover 204 than the C cover RF-transparent window 606, which may allow for emission of antenna radiation 604 closer to the rear edge of the D cover 204, and move the D cover antenna aperture 302 through which antenna radiation 604 may be emitted further away from a human body part interacting with a keyboard within the C cover 208. By moving the source of radiation 604 further from nearby human body parts, the radiation 604 in an embodiment may be less likely to reach SAR limits. In such an embodiment, the C cover RF-transparent window 606 may extend from the rear edge of the D cover 204, overlie the D cover antenna aperture platform 304, and a portion of it may extend past the D cover antenna aperture platform 304, where it then abuts the C cover 208. In such an embodiment, a D cover antenna cavity 610 may be disposed between the portion of the C cover RF-transparent window 606 directly overlying the D cover antenna aperture platform and the C cover 208. The antenna radiation emitted from the left side of the D cover antenna aperture platform 304 described directly above may be emitted through the D cover antenna cavity 610 in the form of antenna cavity radiation 612.

Operating according to the hybrid mode in such an embodiment may resulting in fewer reductions in transmitting antenna 120 power and/or avoidance of emission hot spots, as described herein. As such, the antenna 120 incorporated within a case manufactured according to the hybrid slot/cavity mode may receive more power than an antenna incorporated with a case manufactured according to the slot mode, while still complying with the FCC SAR regulations. The higher power levels supplied to antenna 120 incorporated within a case manufactured according to the hybrid slot/cavity mode may allow the antenna 120 to transceive stronger (e.g. higher quality) signals when a nearby human body part is detected than an antenna housed within a case manufactured according to the slot mode.

Figure 7:
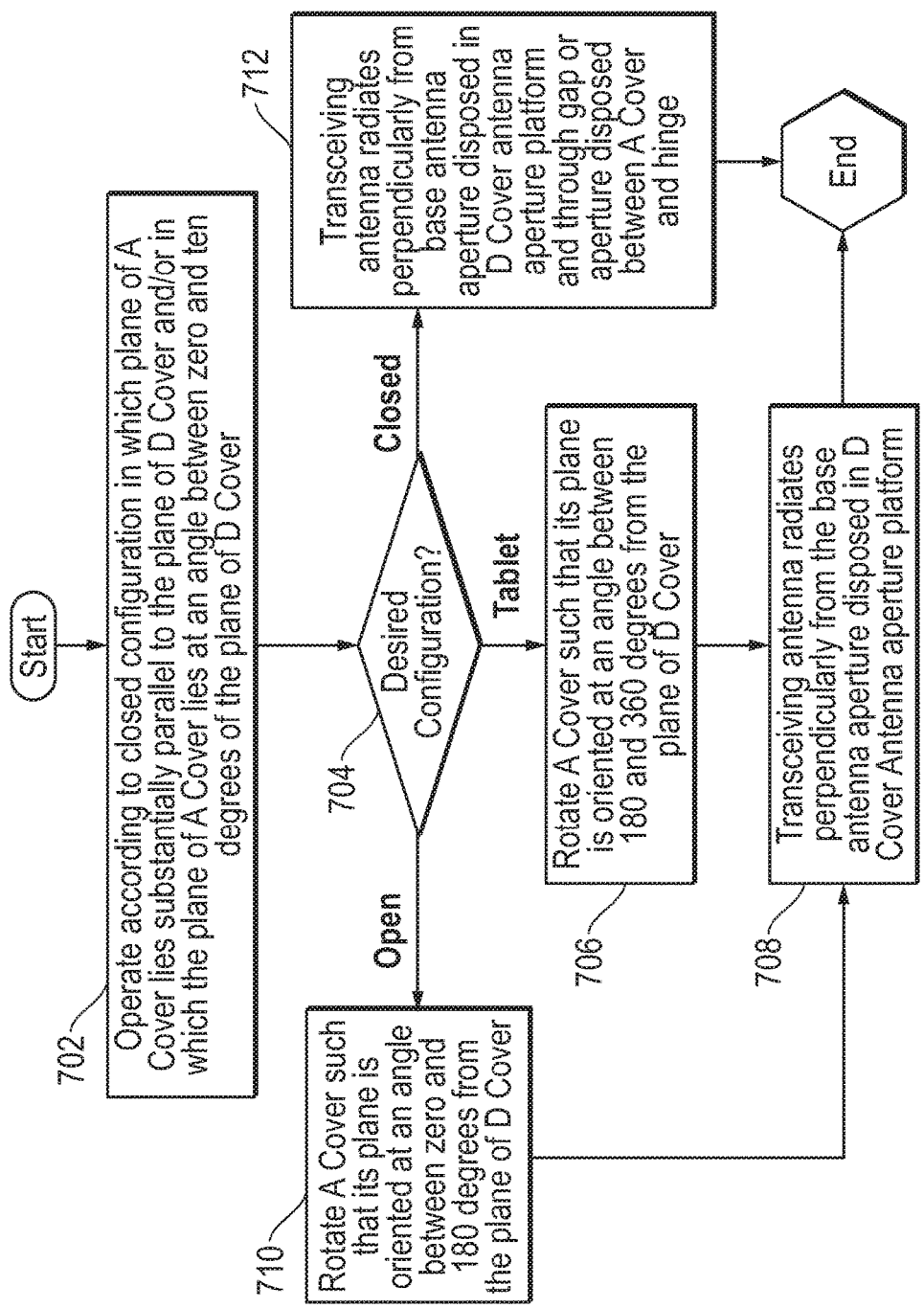
FIG. 7 is a flow diagram illustrating a method for operating an information handling system in a plurality of configurations according to an embodiment of the present disclosure.

FIG. 7 is a flow diagram illustrating a method for operating an information handling system in a plurality of configurations, including an open, closed, and tablet configuration according to an embodiment of the present disclosure. The metal chassis in embodiments described herein may include a hinge operably connecting the "A cover" to the "D cover" such that the keyboard and touchpad enclosed within the "C cover" and attached to the "D cover" may be placed in a plurality of configurations with respect to the digital display enclosed within the "B cover" and attached to the "A cover."

At block 702, in an embodiment, the information handling system may operate according to a closed configuration. In such a closed configuration, the plane of the A cover in an embodiment may lie substantially parallel to the plane of the D cover. In another aspect of an embodiment, the plane of the A cover may be oriented at a small angle with respect to the plane of the D cover, such as for example, less than ten degrees. Both of these orientations of the A cover with respect to the D cover may be included within a closed configuration in an embodiment.

At block 704, it may be determined what the desired configuration of the information handling system is in an embodiment. The plurality of configurations may include, but may not be limited to, an open configuration in which the "A cover" is oriented, for example, at a right or obtuse angle from the "D cover" (similar to an open laptop computer), a closed configuration in which the "A cover" lies substantially parallel to the "D cover" (similar to a closed laptop computer), and a tablet configuration in which the "A cover" is rotated, for example, nearly 360 degrees from its closed orientation (placing the "D cover" directly beneath the "A cover," such that the user can interact with the digital display enclosed within the "B cover").

At block 706, it may be determined the desired configuration for the information handling system in an embodiment is the tablet configuration. In such an embodiment, the A cover may be rotated with respect to the D cover via the hinge operably connecting the A cover and the D cover. The A cover may be rotated in such an embodiment such that its plane is oriented at an angle between 180 and 360 degrees from the plane of the D cover. In another aspect of an embodiment, when the information handling system is placed in the tablet configuration, a user may be capable of interacting directly with a touch-sensitive screen enclosed within the B cover and attached to the A cover, while using the D cover, lying directly beneath the A cover, as a support structure.

At block 708, in an embodiment, while the information handling system is placed in the tablet configuration, the transceiving antenna housed within the D cover may radiate perpendicularly from the surface of the D cover through the D cover antenna aperture disposed within the D cover antenna aperture platform. For example, in an embodiment described with reference to FIG. 5B, the antenna radiation 504 may radiate through the D cover antenna aperture 302 disposed within the D cover antenna aperture platform 304, perpendicularly to the D cover 204. In another aspect, while the information handling system is placed in the tablet configuration, the transceiving antenna may further radiate through a gap between the C cover and the D cover antenna aperture platform. For example, in an embodiment described with reference to FIG. 6, antenna radiation 604 may be emitted through the D cover antenna cavity 602. The method may then end.

At block 710, it may be determined the desired configuration of the information handling system is the open configuration. In such an embodiment, the A cover may be rotated such that its plane is oriented at an angle between zero and 180 degrees from the plane of the D cover. In another aspect, when the information handling system is placed in the open configuration, the user may be capable of viewing and interacting with a keyboard enclosed within the C cover attached to the D cover, and viewing and/or interacting with a digital display enclosed within the B cover attached to the A cover. Upon rotating the A cover with respect to the D cover so as to place the information handling system in an open configuration, the method may proceed to block 708, where the transceiving antenna will transmit an RF signal perpendicularly from the D cover via the D cover antenna aperture and/or a cavity between Cases C and D, as described directly above.

At block 712, it may be determined the desired configuration for the information handling system in an embodiment is to remain in the closed configuration. In such an embodiment, the transceiving antenna may radiate an RF signal at an angle toward the rear edge of the D cover, as described with reference to FIG. 6C. In such an embodiment, the rear edge of the A cover 202 may have a curvilinear cross-section, and when placed in a closed position, may cause a gap 608 to form between the A cover 202 and D cover 204. The antenna in such an embodiment may then emit radiation 604 through the gap 608 formed between the A cover 202 and the D cover 204, despite the A cover 202 and D cover 204 being comprised entirely of metal. In such an embodiment, the antenna formed by the D cover antenna aperture platform 304 may not be aligned with hinge 210 along the back edge of D cover 204 to avoid interfering with transmission through gap 608.

In another embodiment where the hinge 210 may be aligned with the transmitting antenna, the transceiving antenna may radiate an RF signal perpendicularly from the D cover via the D cover antenna aperture and/or the D cover antenna aperture, as described above with reference to FIG. 5C. Because the A cover and B cover lie directly above the C cover and D cover when the information handling system is placed in the closed configuration, the transceiving antenna in such an embodiment may need to transmit an RF signal beyond the A cover. As such, the transceiving antenna in an embodiment in which the information handling system is placed in a closed configuration may further radiate through a gap disposed between the A cover and the hinge, where the hinge is located along the back edge of the D cover such that the gap disposed between the A cover and the hinge is disposed above the D cover antenna aperture 304 in a closed position. For example, in an embodiment described with respect to FIG. 5C, the antenna radiation 504 may radiate perpendicularly from the surface of the A cover 202 via the gap or aperture 214 between the A cover 202 and the hinge 210, which may be located above the D cover antenna aperture 302. At that point, the method may end.

Figure 8:
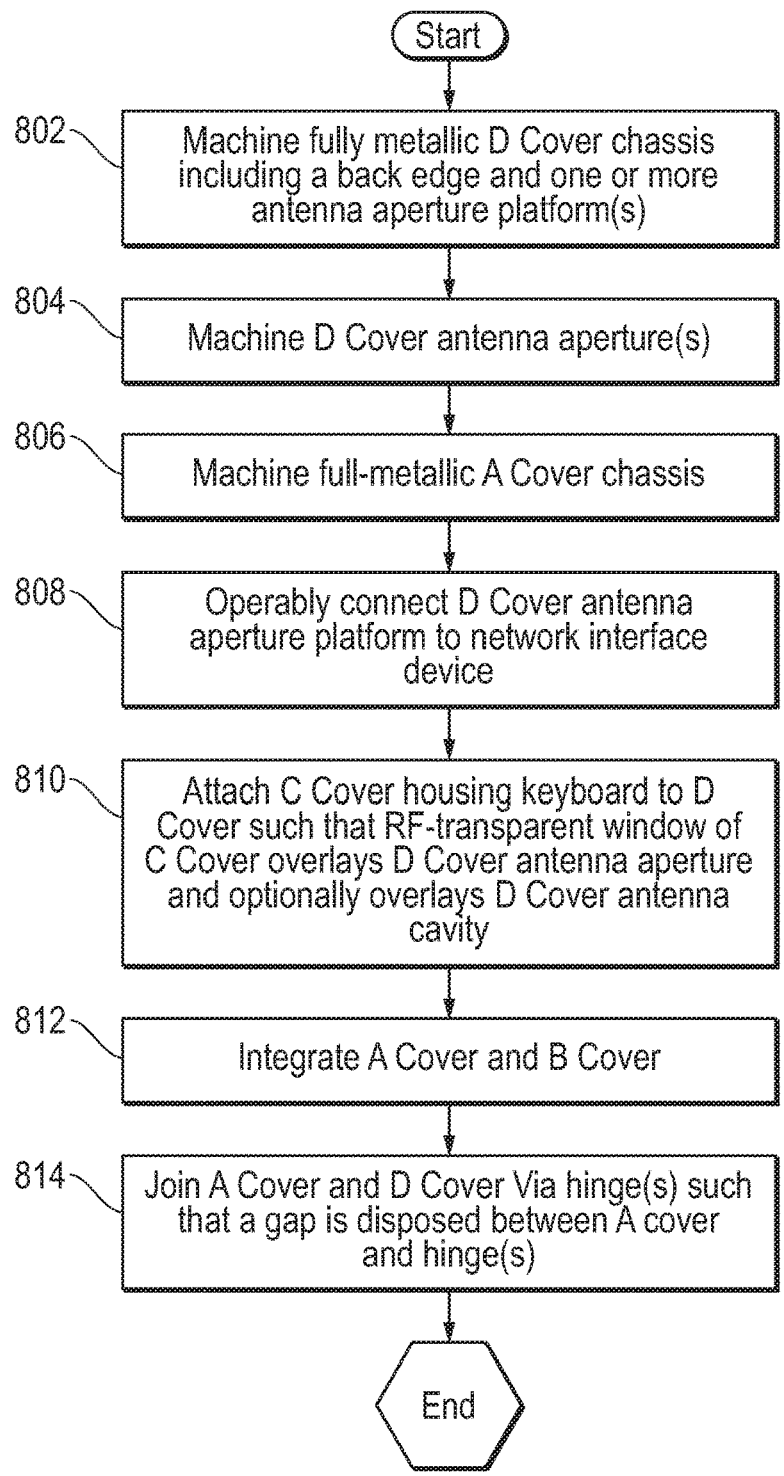
FIG. 8 is a flow diagram illustrating a method of manufacturing a fully metallic case capable of transmitting a communication signal in each of a plurality of positional configurations according to an embodiment of the present disclosure.

FIG. 8 is a flow diagram illustrating a method of manufacturing a fully metallic case enclosing an information handling system capable of transmitting a communication signal in each of a plurality of positional configurations according to an embodiment of the present disclosure. At block 802, in an embodiment, a fully metallic D cover chassis including a back edge and one or more D cover antenna aperture platforms may be machined. The fully metallic D cover chassis in an embodiment may form the outer case for the base portion of a mobile information handling system such as a tablet device, or laptop computer. The D cover chassis in embodiments may differ from prior art chasses employing plastic components or RF-transparent windows in that the D cover is fully metallic, requiring fewer manufacturing steps and comparably lower manufacturing costs. In an embodiment, the D cover may include one or more D cover antenna aperture platforms extending from a back edge of the D cover chassis. For example, with reference to FIG. 3, the D cover antenna aperture platform 304 may extend from the back edge 212 of the D Cover 204.

Returning to FIG. 8, at block 804, a D cover antenna aperture may be machined through one or more D cover antenna apertures. The D cover antenna aperture may be machined by using a simple T-cutter to cut a slot within each of the D cover antenna aperture platforms. For example, with reference to FIG. 3, a D cover antenna aperture 302 may be machined in each D cover antenna aperture platform 304. Chasses having D cover antenna apertures may be referred to as operating in "slot mode," as described herein.

At block 806, a fully-metallic A cover chassis may be machined. The fully metallic A cover chassis in an embodiment may form the outer case for the portion of the mobile information handling system including the digital display. Similar to the D cover chassis, the A cover may also differ from prior art chasses because it is fully metallic, requiring fewer components and less complex manufacturing methods.

At block 808, in an embodiment, the D cover antenna aperture platform may be operably connected to the wireless interface device including one or more transceiving antennas. A transceiving antenna may be placed within the D cover, directly beneath a D cover antenna aperture disposed within a D cover antenna aperture platform. As described herein, the transceiving antenna in some embodiments may be an aperture antenna. In such embodiments, the aperture antenna may be operably connected to the D cover antenna aperture platform, allowing the D cover antenna aperture platform to act as an excitation structure for the aperture antenna. For example, with reference to FIG. 5A, the antenna 120 may be incorporated within the D cover cavity 502, directly beneath the D cover antenna aperture 302. The antenna 120 in such an embodiment may then be operably connected to the D cover antenna aperture platform 304.

At block 810, the C cover housing the keyboard in an embodiment may be attached to the D cover such that an RF transparent window of the C cover overlays the D cover antenna aperture. The C cover housing may include a keyboard and one or more RF transparent windows that operate to allow radio frequency transmissions to emit through the window. For example, in an embodiment described with reference to FIG. 2B, the C cover 208 may include a keyboard 112. As another example, in an embodiment described with reference to FIG. 5A, the C cover 208 may also include a C cover RF-transparent window 506 disposed between the C cover 208 and the D cover 204 such that the RF-transparent window 506 overlays the D cover antenna aperture 302. In some embodiments, the C cover housing RF-transparent window may also overlay a D cover antenna cavity in embodiments involving the hybrid slot-cavity mode. For example, in an embodiment described with reference to FIG. 6, the C cover housing RF-transparent window 506 may overlay the D cover antenna aperture 302, the D cover antenna aperture platform 304, and the D cover antenna cavity 602.

The A cover may be integrated with the B cover at step 812 in an embodiment. The B cover in an embodiment may include a digital display, and the A cover may form an outer protective case for such a digital display. For example, in an embodiment described with reference to FIGS. 2A and 2B, the A cover 202 may be integrated with the B cover 206 to form an outer protective case for the B cover/display 206.

At block 814, the A cover in an embodiment may be joined to the D cover via a hinge such that a gap is disposed between the A cover and the hinge. For example, with reference to FIG. 2A, the A cover 202 may be joined to the D cover 204 via one or more hinges 210 along the D cover back edge 212 such that a gap aperture 214 is disposed between the A cover 202 and the hinge 210. The one or more hinges in an embodiment may be placed such that the gap or aperture between the A cover and the hinge will lie above the D cover antenna aperture when the A cover and D cover are placed in a closed configuration. For example, in an embodiment described with reference to FIG. 5C, the hinge 210 may be placed along the length back edge of the D Cover such that the gap or aperture 214 between the A cover 202 and the hinge 210 is located above the D cover antenna aperture 302 when the A cover 202 and the D cover 204 are placed in a closed configuration. In such an embodiment, the antenna 120 may emit antenna radiation 504 through the D cover antenna aperture 302, the C cover RF-transparent window 506 and the gap or aperture 214 between the A cover 202 and the hinge 210, such that the antenna radiation 504 may emit from the outer surface of the information handling system even when placed in a closed configuration. The method may then end.

The blocks of flow diagrams 7-8 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operable to transition between a plurality of positional configurations comprising:
    a metallic case containing components of the information handling system including a base housing metal chassis operably connected to a display housing metal chassis via a hinge;
    the base housing metal chassis and display housing metal chassis moveable with respect to one another around the hinge according to a plurality of positional configurations;
    the base housing metal chassis forming a back edge of a base housing;
    a base antenna aperture platform extending from the back edge and forming a portion of the base housing metal chassis;
    a base antenna aperture disposed within the base antenna aperture platform; and
    a radio frequency front end to transmit a communications signal via the base antenna aperture when the base housing metal chassis and display housing metal chassis are placed in the plurality of positional configurations.

2. The information handling system of claim 1, wherein the plurality of positional configurations includes an open positional configuration, a closed positional configuration, and a tablet positional configuration.

3. The information handling system of claim 1 further comprising:
    a display housing aperture disposed between the display housing metal chassis and the hinge through which the transmitting base antenna aperture transmits the communications signal when the base metal chassis and display housing metal chassis are placed in a closed positional configuration.

4. The information handling system of claim 1 further comprising:
a gap disposed between the display housing metal chassis and the base metal chassis along a back edge of the base metal chassis through which the transmitting base antenna aperture transmits the communications signal when the base metal chassis and display housing metal chassis are placed in a closed positional configuration.

5. The information handling system of claim 1 further comprising:
a keyboard housing cover metal frame operatively coupled to the base housing metal chassis to form a base housing cavity for the base housing and spaced to form a second cavity antenna aperture between the keyboard housing cover metal frame and the base antenna aperture platform; and
the radio frequency front end transmits the communications signal such that an emission of the communications signal is distributed between the base antenna aperture and the second cavity antenna aperture.

6. The information handling system of claim 4, wherein the keyboard housing cover metal frame is disposed parallel to a portion of the base housing metal chassis forming the bottom of the base housing and above the base antenna aperture platform to provide a horizontal gap for a second cavity antenna aperture.

7. The information handling system of claim 6 wherein distribution of the emission of the communications signal between the base antenna aperture and the second cavity antenna aperture decreases the standard absorption rate of the communications signal without decreasing power delivered from the radio frequency front end.

8. The information handling system of claim 4 further comprising:
a plastic keyboard housing cover covering the base antenna aperture platform and operatively coupled to the base housing metal chassis to form a base housing cavity of the base housing in which the base antenna aperture platform is disposed.

9. A method for transmitting a communication signal from an information system operating in a plurality of positional configurations comprising:
operating an information handling system enclosed within a metallic case including a base housing metal chassis operably connected to a display housing metal chassis via a hinge at a plurality of positional configurations describing an orientation of the display housing metal chassis with respect to the base housing metal chassis;
transmitting a communications signal, via a radio frequency front end transmitting from a base antenna aperture disposed within the base housing aperture platform extending from a back edge of the base housing metal chassis and forming a portion of the base housing metal chassis, when the base housing metal chassis and display housing metal chassis are placed in any of the plurality of positional configurations; and
transmitting the communications signal through a keyboard housing cover of radio frequency transparent material covering the base antenna aperture platform and operatively coupled to the base housing metal chassis to form a base housing cavity in which the base antenna aperture platform is disposed.

10. The method of claim 9, wherein the plurality of positional configurations includes an open positional configuration, a closed positional configuration, and a tablet positional configuration.

11. The method of claim 9 further comprising:
transmitting the communications signal via a second cavity antenna aperture between a keyboard housing cover metal frame supporting a portion of the keyboard housing cover and the base antenna aperture platform through which radio frequency front end also transmits the communications signal.

12. The method of claim 9 further comprising:
configuring the information system to a closed positional configuration;
transmitting the communications signal via a gap formed between the display housing metal chassis and the base housing metal chassis, wherein the base antenna aperture platform aligned with the hinge along the back edge of the base housing metal chassis.

13. The method of claim 8 further comprising:
transmitting the communications signal via the base antenna aperture and a second cavity antenna aperture at an edge of the base antenna aperture platform such that an emission of the communications signal is distributed between the base antenna aperture and the second cavity antenna aperture.

14. The method of claim 13 wherein distribution of the emission of the communications signal decreases the standard absorption rate of the communications signal without decreasing power delivered by the radio frequency front end.

15. An information handling system operating in one of a plurality of positional configurations to transmit a communication signal comprising:
a metallic case of the information handling system including a base housing metal chassis operably connected to a display housing metal chassis via a hinge;
the base housing metal chassis and display housing metal chassis moveable with respect to one another according to a plurality of positional configurations including an open positional configuration, a closed positional configuration, and a tablet positional configuration;
the base housing metal chassis forming a back edge of a base housing and a base antenna aperture platform extending from the back edge of the base housing;
a base antenna aperture disposed within the base antenna aperture platform, through which a radio frequency front end transmits a communications signal when the base housing metal chassis and display housing metal chassis are placed in the plurality of positional configurations;
a second cavity antenna aperture at an edge of the base antenna aperture platform such that transmission of the communications signal is distributed between the base antenna aperture and the second cavity antenna aperture to decrease the standard absorption rate (SAR) hotspot level of the communications signal.

16. The information handling system of claim 15 further comprising:
a keyboard housing cover metal frame operatively coupled to the base housing metal chassis to form a base housing cavity for the base housing and spaced to form the second cavity antenna aperture between the keyboard housing cover metal frame and the edge of the base antenna aperture platform.

17. The information handling system of claim 16 further comprising:
the keyboard housing cover metal frame operatively coupled to the base housing metal chassis above the base antenna aperture platform and the second cavity antenna aperture between the keyboard housing cover metal frame and the edge of the base antenna aperture platform; and the base antenna aperture platform under the level of a radiofrequency-transparent keyboard housing cover extending over the base antenna aperture platform, wherein the SAR hotspot location of the communications signal transmission is lower than a surface of the keyboard housing cover.

18. The information handling system of claim 17 further comprising:
a radio frequency transparent trim piece attached over base antenna aperture platform and disposed between a keyboard and the hinge through which the radio frequency front end may transmit the communication signal via the base antenna aperture.

19. The information handling system of claim 15 further comprising:
the information system configured to the closed positional configuration; and
a display housing aperture between the display housing metal chassis and the hinge transmitting the communications signal.

20. The information handling system of claim 15 further comprising:
the information system configured to the closed positional configuration; and
a gap disposed between the display housing metal chassis and the base metal chassis along a back edge of the base metal chassis through which the transmitting base antenna aperture transmits the communications signal.

* * * * *